(12) United States Patent
Ogasawara

(10) Patent No.: US 10,747,410 B2
(45) Date of Patent: Aug. 18, 2020

(54) IMAGE DISPLAY APPARATUS, IMAGE DISPLAY METHOD, AND STORAGE MEDIUM

(71) Applicant: CANON KABUSHIKI KAISHA, Tokyo (JP)

(72) Inventor: Taku Ogasawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 15/402,569

(22) Filed: Jan. 10, 2017

(65) Prior Publication Data

US 2017/0212665 A1    Jul. 27, 2017

(30) Foreign Application Priority Data

Jan. 25, 2016   (JP) ................................. 2016-011711

(51) Int. Cl.
| | |
|---|---|
| G06F 3/0484 | (2013.01) |
| G06F 3/0482 | (2013.01) |
| G06F 3/0488 | (2013.01) |
| G09G 5/14 | (2006.01) |
| G06F 40/103 | (2020.01) |

(52) U.S. Cl.
CPC ........ *G06F 3/04845* (2013.01); *G06F 3/0482* (2013.01); *G06F 3/04886* (2013.01); *G06F 40/103* (2020.01); *G09G 5/14* (2013.01)

(58) Field of Classification Search
CPC . G06F 3/04845; G06F 3/0482; G06F 3/04883
See application file for complete search history.

(56) References Cited

U.S. PATENT DOCUMENTS

| | | | | |
|---|---|---|---|---|
| 5,434,626 A | * | 7/1995 | Hayashi | ............. H04N 5/44543 348/565 |
| 7,870,503 B1 | * | 1/2011 | Levy | ........................ G06F 9/451 715/783 |

(Continued)

FOREIGN PATENT DOCUMENTS

| | | |
|---|---|---|
| JP | 2008170638 A | 7/2008 |
| JP | 4244068 B1 | 3/2009 |
| JP | 2011-186742 A | 9/2011 |

OTHER PUBLICATIONS

Miki Nonoyama, et al., Sokko! Zukai PowerPoint 2013, First Edition, Feb. 14, 2013, pp. 288, 296-297, 334, Mainabi, Japan.

*Primary Examiner* — Shourjo Dasgupta

(74) *Attorney, Agent, or Firm* — Canon U.S.A., Inc. IP Division

(57) ABSTRACT

An image display apparatus includes a first display control unit configured to enlarge and display a target object on a screen among a plurality of objects included in an image, and, based on receiving an instruction to display on the screen an object other than the target object being displayed on the screen from a user, to display a next object to be displayed, a second display control unit configured to display the image on the screen, and, in a case where the instruction from the user is received while display of the screen is controlled by the first display control unit, display an image on the screen with respect to each of the plurality of objects, the image indicating display order, and a changing unit configured to change the display order by receiving the user's operation for which display is controlled by the second display control unit.

13 Claims, 21 Drawing Sheets

(56) References Cited

U.S. PATENT DOCUMENTS

| | | | | |
|---|---|---|---|---|
| 8,806,376 | B2* | 8/2014 | Park | H04M 1/72544 715/705 |
| 8,996,350 | B1* | 3/2015 | Dub | G06F 17/30011 704/1 |
| 9,857,941 | B2* | 1/2018 | Wagner | G06F 3/04817 |
| 2004/0044283 | A1* | 3/2004 | Yoneyama | A61B 8/14 600/437 |
| 2005/0034077 | A1* | 2/2005 | Jaeger | G06F 3/0481 715/732 |
| 2005/0188332 | A1* | 8/2005 | Kolman | G06F 3/0481 715/822 |
| 2007/0136351 | A1* | 6/2007 | Dames | G06F 17/50 |
| 2008/0215967 | A1* | 9/2008 | Abrams | G06F 17/3089 715/255 |
| 2009/0019399 | A1* | 1/2009 | Matsunaga | G06F 3/04817 715/838 |
| 2009/0164944 | A1* | 6/2009 | Webster | G06F 3/0489 715/838 |
| 2010/0251102 | A1* | 9/2010 | Chen | G06F 16/9577 715/243 |
| 2011/0078560 | A1* | 3/2011 | Weeldreyer | G06F 17/214 715/255 |
| 2012/0036435 | A1* | 2/2012 | Yang | G06F 3/0482 715/702 |
| 2012/0210200 | A1* | 8/2012 | Berger | G06F 3/0481 715/202 |
| 2013/0100036 | A1* | 4/2013 | Papakipos | G06F 1/1643 345/173 |
| 2013/0132895 | A1* | 5/2013 | Nemeth | G06F 3/0482 715/799 |
| 2014/0047334 | A1* | 2/2014 | Nouard | G06F 9/453 715/705 |
| 2015/0012860 | A1* | 1/2015 | Cha | G06F 3/0486 715/769 |
| 2015/0067605 | A1* | 3/2015 | Zambetti | G06F 3/0485 715/830 |
| 2015/0095755 | A1* | 4/2015 | Bonk | G06F 17/2288 715/229 |
| 2015/0113412 | A1* | 4/2015 | Peyton | G06Q 10/10 715/732 |
| 2015/0370399 | A1* | 12/2015 | Kim | H04M 1/72563 345/173 |
| 2016/0124909 | A1* | 5/2016 | Basson | G10L 25/27 715/732 |

* cited by examiner

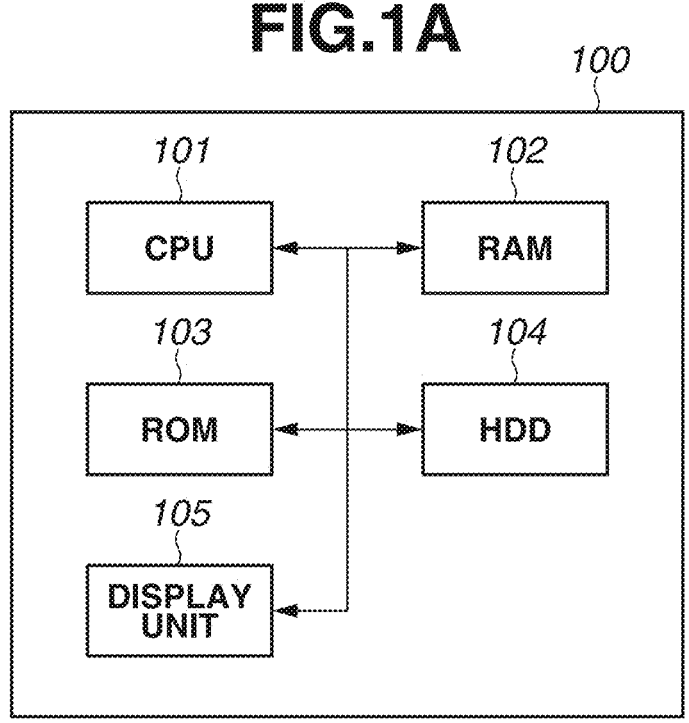
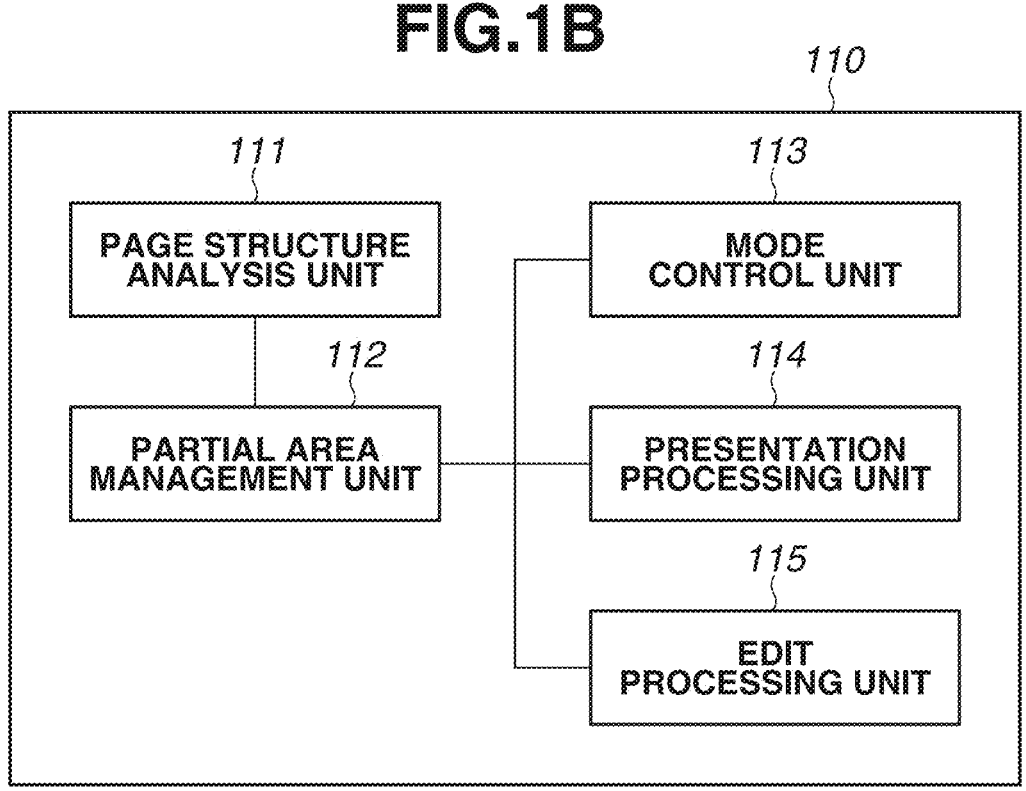

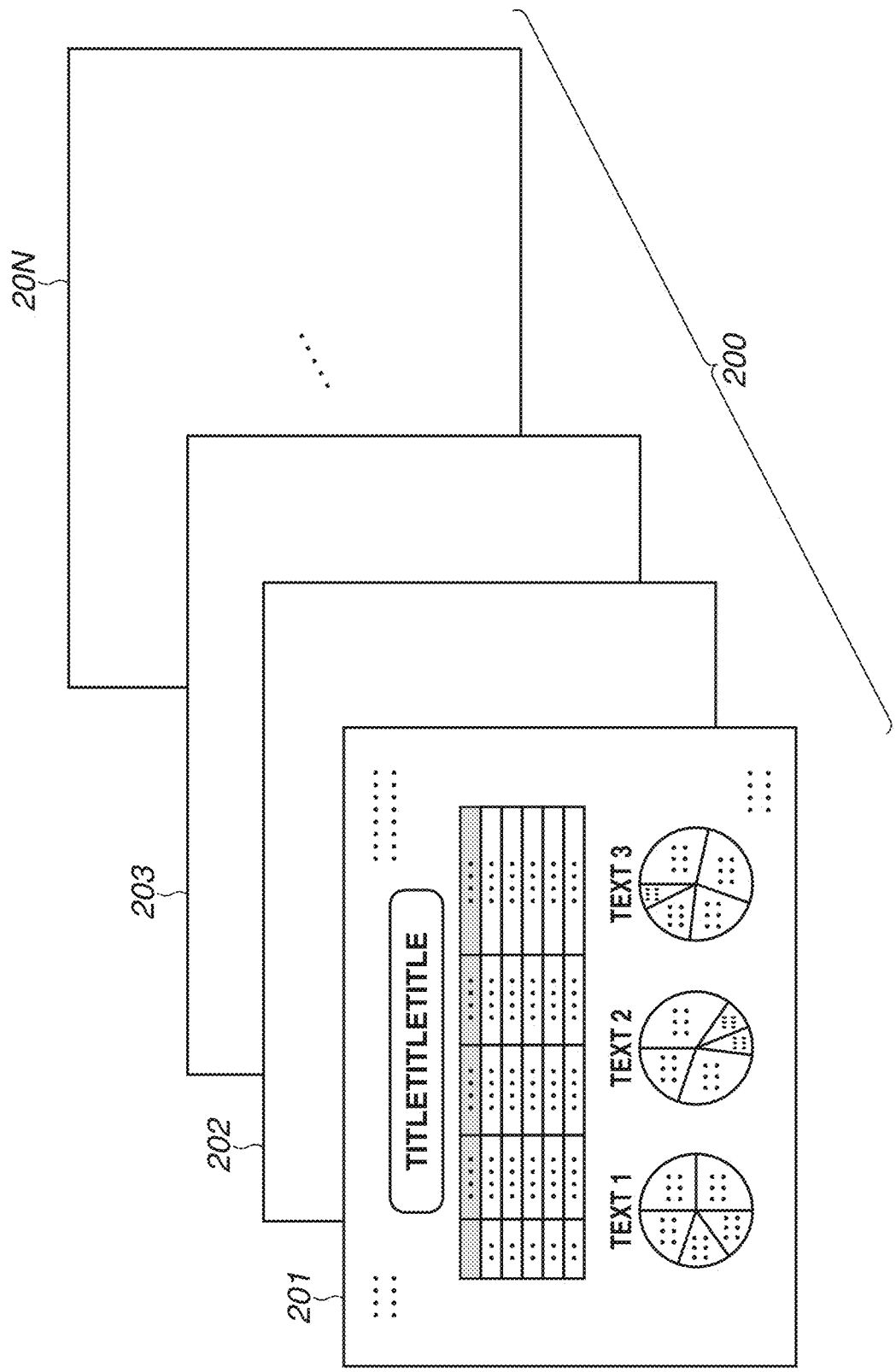

FIG.5A

| PAGE NUMBER | PARTIAL AREA NUMBER | COORDINATES (x, y) | WIDTH AND HEIGHT (w, h) | AREA ATTRIBUTE | DISPLAY SETTING | CHARACTER DIRECTION | CHARACTER SIZE | DISPLAY ORDER |
|---|---|---|---|---|---|---|---|---|
| 1 | 0 | (x10, y10) | (w10, h10) | BACKGROUND | DISPLAY | — | — | 0 |
| 1 | 1 | (x11, y11) | (w11, h11) | HEADER | HIDDEN | HORIZONTAL | S11 | 1 |
| 1 | 2 | (x12, y12) | (w12, h12) | HEADER | HIDDEN | HORIZONTAL | S12 | 2 |
| 1 | 3 | (x13, y13) | (w13, h13) | TITLE | DISPLAY | HORIZONTAL | S13 | 3 |
| 1 | 4 | (x14, y14) | (w14, h14) | TABLE | DISPLAY | HORIZONTAL | S14 | 4 |
| 1 | 5 | (x15, y15) | (w15, h15) | FIGURE | DISPLAY | — | — | 5 |
| 1 | 6 | (x16, y16) | (w16, h16) | FIGURE | DISPLAY | — | — | 6 |
| 1 | 7 | (x17, y17) | (w17, h17) | FIGURE | DISPLAY | — | — | 7 |
| 1 | 8 | (x18, y18) | (w18, h18) | FOOTER | HIDDEN | HORIZONTAL | S18 | 8 |
| 2 | 0 | (x20, y20) | (w20, h20) | BACKGROUND | DISPLAY | — | — | 0 |

FIG.5B

| PAGE NUMBER | PARTIAL AREA NUMBER | COORDINATES (x, y) | WIDTH AND HEIGHT (w, h) | AREA ATTRIBUTE | DISPLAY SETTING | CHARACTER DIRECTION | CHARACTER SIZE | DISPLAY ORDER |
|---|---|---|---|---|---|---|---|---|
| 1 | 0 | (x10, y10) | (w10, h10) | BACKGROUND | DISPLAY | — | — | 0 |
| 1 | 1 | (x11, y11) | (w11, h11) | HEADER | HIDDEN | HORIZONTAL | S11 | 1 |
| 1 | 2 | (x12, y12) | (w12, h12) | HEADER | HIDDEN | HORIZONTAL | S12 | 2 |
| 1 | 3 | (x13, y13) | (w13, h13) | TITLE | DISPLAY | HORIZONTAL | S13 | 3 |
| 1 | 4 | (x14, y14) | (w14, h14) | TABLE | DISPLAY | HORIZONTAL | S14 | 4 |
| 1 | 5 | (x15, y15) | (w15, h15) | FIGURE | DISPLAY | — | — | 6 |
| 1 | 6 | (x16, y16) | (w16, h16) | FIGURE | DISPLAY | — | — | 7 |
| 1 | 7 | (x17, y17) | (w17, h17) | FIGURE | DISPLAY | — | — | 5 |
| 1 | 8 | (x18, y18) | (w18, h18) | FOOTER | HIDDEN | HORIZONTAL | S18 | 8 |
| 2 | 0 | (x20, y20) | (w20, h20) | BACKGROUND | DISPLAY | — | — | 0 |

FIG.5C

| PAGE NUMBER | PARTIAL AREA NUMBER | COORDINATES (x, y) | WIDTH AND HEIGHT (w, h) | AREA ATTRIBUTE | DISPLAY SETTING | CHARACTER DIRECTION | CHARACTER SIZE | DISPLAY ORDER |
|---|---|---|---|---|---|---|---|---|
| 1 | 0 | (x10, y10) | (w10, h10) | BACKGROUND | DISPLAY | — | — | 0 |
| 1 | 1 | (x11, y11) | (w11, h11) | HEADER | HIDDEN | HORIZONTAL | S11 | 1 |
| 1 | 2 | (x12, y12) | (w12, h12) | HEADER | HIDDEN | HORIZONTAL | S12 | 2 |
| 1 | 3 | (x13, y13) | (w13, h13) | TITLE | DISPLAY | HORIZONTAL | S13 | 3 |
| 1 | 4 | (x14, y14) | (w14, h14) | TABLE | DISPLAY | HORIZONTAL | S14 | 4 |
| 1 | 5 | (x15, y15) | (w15, h15) | FIGURE | DISPLAY | — | — | 7 |
| 1 | 6 | (x16, y16) | (w16, h16) | FIGURE | DISPLAY | — | — | 6 |
| 1 | 7 | (x17, y17) | (w17, h17) | FIGURE | DISPLAY | — | — | 5 |
| 1 | 8 | (x18, y18) | (w18, h18) | FOOTER | HIDDEN | HORIZONTAL | S18 | 8 |
| 2 | 0 | (x20, y20) | (w20, h20) | BACKGROUND | DISPLAY | — | — | 0 |

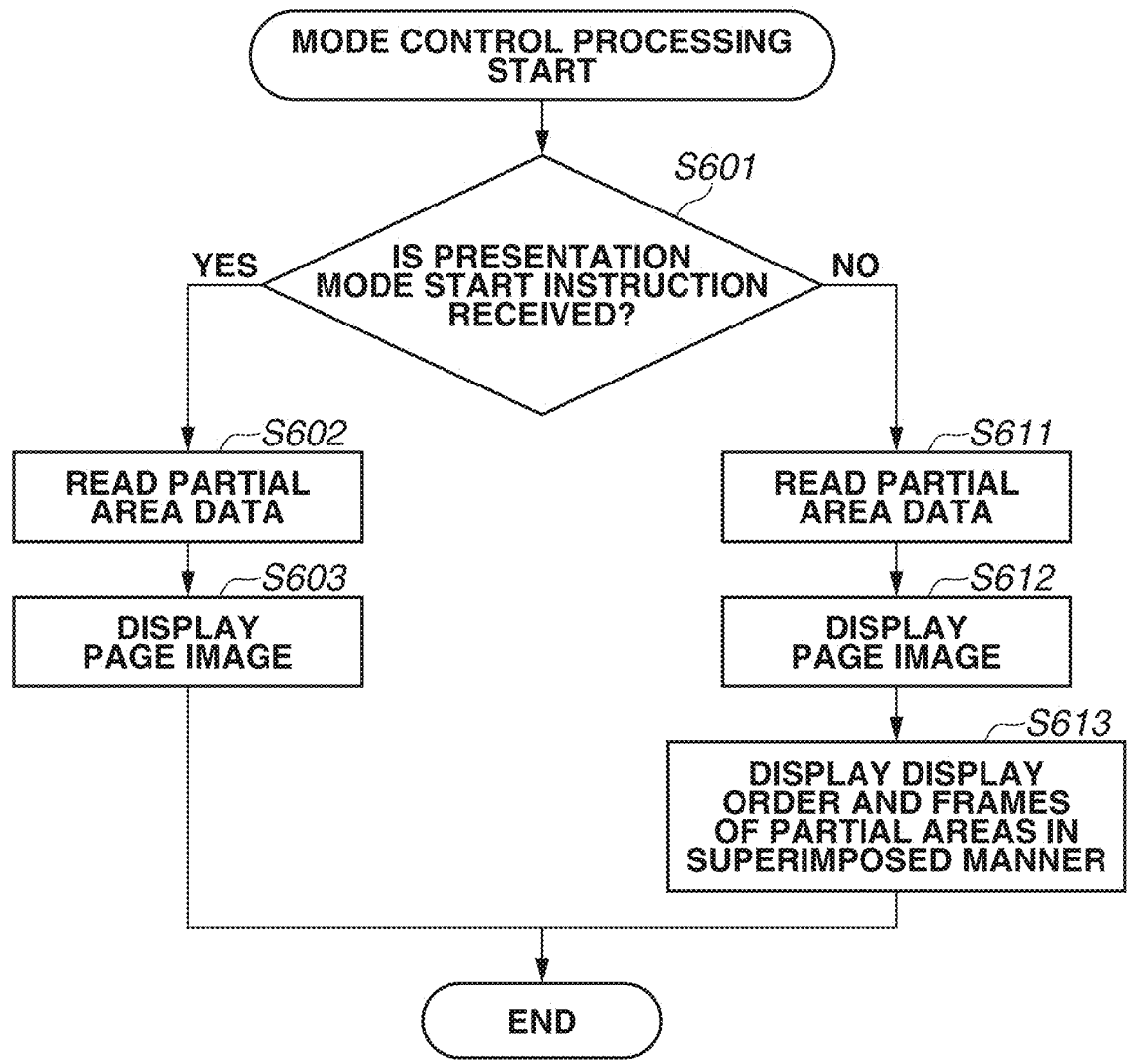

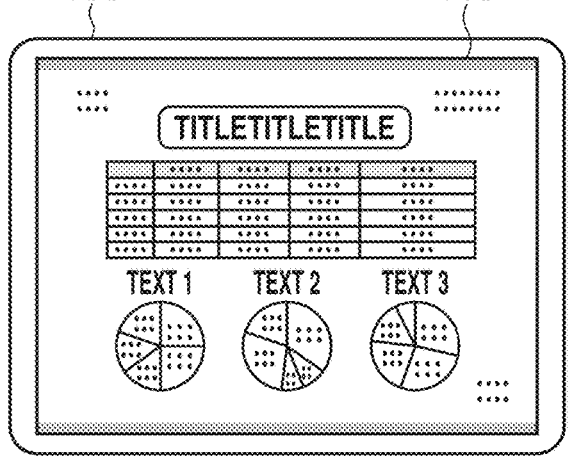
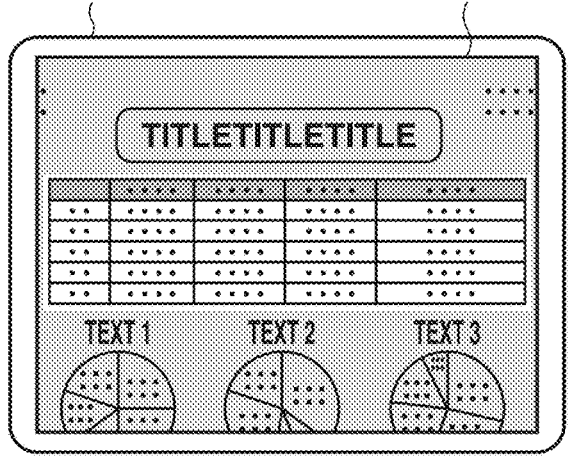
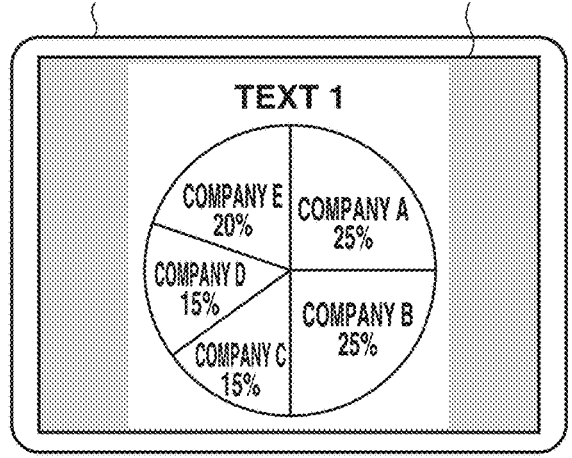
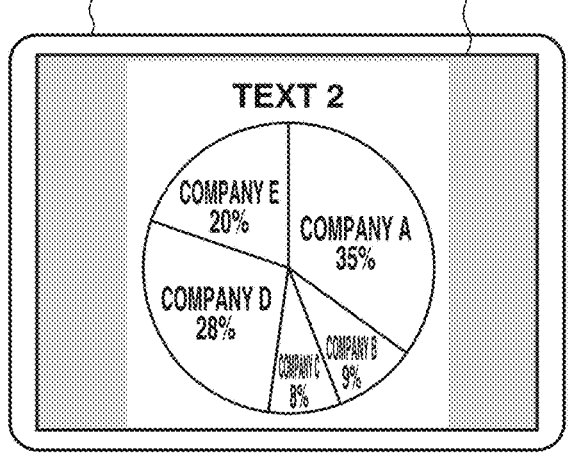
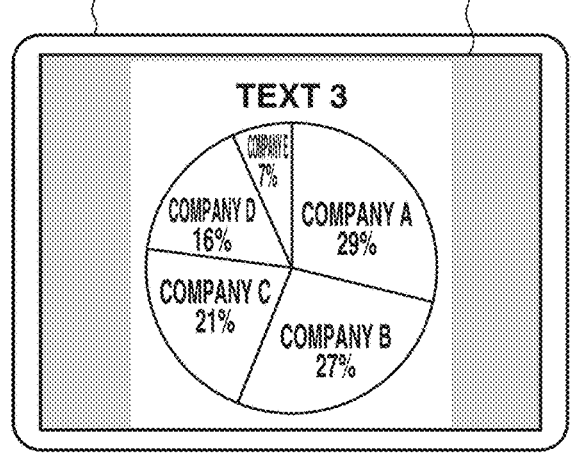

FIG.17A

| PAGE NUMBER | PARTIAL AREA NUMBER | COORDINATES (x, y) | WIDTH AND HEIGHT (w, h) | AREA ATTRIBUTE | DISPLAY SETTING | CHARACTER DIRECTION | CHARACTER SIZE | DISPLAY ORDER |
|---|---|---|---|---|---|---|---|---|
| 1 | 0 | (x10, y10) | (w10, h10) | BACKGROUND | DISPLAY | — | — | 0 |
| 1 | 1 | (x11, y11) | (w11, h11) | HEADER | HIDDEN | HORIZONTAL | S11 | 1 |
| 1 | 2 | (x12, y12) | (w12, h12) | HEADER | HIDDEN | HORIZONTAL | S12 | 2 |
| 1 | 3 | (x13, y13) | (w13, h13) | TITLE | DISPLAY | HORIZONTAL | S13 | 3 |
| 1 | 4 | (x14, y14) | (w14, h14) | TABLE | DISPLAY | HORIZONTAL | S14 | 4 |
| 1 | 5 | (x15, y15) | (w15, h15) | FIGURE | DISPLAY | — | — | 6 |
| 1 | 6 | (x16, y16) | (w16, h16) | FIGURE | DISPLAY | — | — | 7 |
| 1 | 7 | (x17, y17) | (w17, h17) | FIGURE | DISPLAY | — | — | 5 |
| 1 | 8 | (x18, y18) | (w18, h18) | FOOTER | HIDDEN | HORIZONTAL | S18 | 8 |
| 2 | 0 | (x20, y20) | (w20, h20) | BACKGROUND | DISPLAY | — | — | 0 |

FIG.17B

| PAGE NUMBER | PARTIAL AREA NUMBER | COORDINATES (x, y) | WIDTH AND HEIGHT (w, h) | AREA ATTRIBUTE | DISPLAY SETTING | CHARACTER DIRECTION | CHARACTER SIZE | DISPLAY ORDER |
|---|---|---|---|---|---|---|---|---|
| 1 | 0 | (x10, y10) | (w10, h10) | BACKGROUND | DISPLAY | — | — | 0 |
| 1 | 1 | (x11, y11) | (w11, h11) | HEADER | HIDDEN | HORIZONTAL | S11 | 1 |
| 1 | 2 | (x12, y12) | (w12, h12) | HEADER | HIDDEN | HORIZONTAL | S12 | 2 |
| 1 | 3 | (x13, y13) | (w13, h13) | TITLE | DISPLAY | HORIZONTAL | S13 | 3 |
| 1 | 4 | (x14, y14) | (w14, h14) | TABLE | DISPLAY | HORIZONTAL | S14 | 4 |
| 1 | 5 | (x15, y15) | (w15, h15) | FIGURE | DISPLAY | — | — | 5 |
| 1 | 6 | (x16, y16) | (w16, h16) | FIGURE | DISPLAY | — | — | 7 |
| 1 | 7 | (x17, y17) | (w17, h17) | FIGURE | DISPLAY | — | — | 6 |
| 1 | 8 | (x18, y18) | (w18, h18) | FOOTER | HIDDEN | HORIZONTAL | S18 | 8 |
| 2 | 0 | (x20, y20) | (w20, h20) | BACKGROUND | DISPLAY | — | — | 0 |

FIG.20A

| PAGE NUMBER (501) | PARTIAL AREA NUMBER (502) | COORDINATES (x, y) (503) | WIDTH AND HEIGHT (w, h) (504) | AREA ATTRIBUTE (505) | DISPLAY SETTING (506) | CHARACTER DIRECTION (507) | CHARACTER SIZE (508) | DISPLAY ORDER (509) |
|---|---|---|---|---|---|---|---|---|
| 1 | 0 | (x10, y10) | (w10, h10) | BACKGROUND | DISPLAY | — | — | 0 |
| 1 | 1 | (x11, y11) | (w11, h11) | HEADER | HIDDEN | HORIZONTAL | S11 | 1 |
| 1 | 2 | (x12, y12) | (w12, h12) | HEADER | HIDDEN | HORIZONTAL | S12 | 2 |
| 1 | 3 | (x13, y13) | (w13, h13) | TITLE | DISPLAY | HORIZONTAL | S13 | 3 |
| 1 | 4 | (x14, y14) | (w14, h14) | TABLE | DISPLAY | HORIZONTAL | S14 | 4 |
| 1 | 5 | (x15, y15) | (w15, h15) | FIGURE | DISPLAY | — | — | 6 |
| 1 | 6 | (x16, y16) | (w16, h16) | FIGURE | DISPLAY | — | — | 5 |
| 1 | 7 | (x17, y17) | (w17, h17) | FIGURE | DISPLAY | — | — | 7 |
| 1 | 8 | (x18, y18) | (w18, h18) | FOOTER | HIDDEN | HORIZONTAL | S18 | 8 |
| 2 | 0 | (x20, y20) | (w20, h20) | BACKGROUND | DISPLAY | — | — | 0 |

FIG.20B

| PAGE NUMBER (501) | PARTIAL AREA NUMBER (502) | COORDINATES (x, y) (503) | WIDTH AND HEIGHT (w, h) (504) | AREA ATTRIBUTE (505) | DISPLAY SETTING (506) | CHARACTER DIRECTION (507) | CHARACTER SIZE (508) | DISPLAY ORDER (509) |
|---|---|---|---|---|---|---|---|---|
| 1 | 0 | (x10, y10) | (w10, h10) | BACKGROUND | DISPLAY | — | — | 0 |
| 1 | 1 | (x11, y11) | (w11, h11) | HEADER | HIDDEN | HORIZONTAL | S11 | 1 |
| 1 | 2 | (x12, y12) | (w12, h12) | HEADER | HIDDEN | HORIZONTAL | S12 | 2 |
| 1 | 3 | (x13, y13) | (w13, h13) | TITLE | DISPLAY | HORIZONTAL | S13 | 3 |
| 1 | 4 | (x14, y14) | (w14, h14) | TABLE | DISPLAY | HORIZONTAL | S14 | 5 |
| 1 | 5 | (x15, y15) | (w15, h15) | FIGURE | DISPLAY | — | — | 4 |
| 1 | 6 | (x16, y16) | (w16, h16) | FIGURE | DISPLAY | — | — | 6 |
| 1 | 7 | (x17, y17) | (w17, h17) | FIGURE | DISPLAY | — | — | 7 |
| 1 | 8 | (x18, y18) | (w18, h18) | FOOTER | HIDDEN | HORIZONTAL | S18 | 8 |
| 2 | 0 | (x20, y20) | (w20, h20) | BACKGROUND | DISPLAY | — | — | 0 |

IMAGE DISPLAY APPARATUS, IMAGE DISPLAY METHOD, AND STORAGE MEDIUM

BACKGROUND OF THE INVENTION

Field of the Invention

The present invention relates to a technique for changing display order of partial areas of a page image in a system that displays the partial areas in order.

Description of the Related Art

Materials used for a presentation given in a conference room or product explanation in face-to-face sales are typically displayed page by page on an image display apparatus for explanation, each single page image (slide) constituting the materials. Depending on the composition of the materials, some slides may be difficult for the audience to understand where the speaker is explaining. The audience may get bored if the same slide continues to be displayed and described for a long time without a change.

Some image display methods display a page image in consideration of a small screen of a mobile terminal such as a smartphone. Japanese Patent Application Laid-Open No. 2008-170638 discusses an image display method for automatically analyzing partial areas of a page image according to document components such as characters and figures included in the page image. Each of the automatically-analyzed partial areas can be displayed at an enlargement factor of the corresponding partial area, adjusted to the small screen of the mobile terminal, with a simple operation such as a button tap.

A mobile terminal discussed in Japanese Patent Application Laid-Open No. 2008-170638 is connected to a projector, and the projector projects images displayed on the mobile terminal for presentation. In such a case, each of the partial areas recognized in advance can be displayed in order at an enlargement factor for the corresponding partial area, so that the audience can easily understand where on the slide the speaker is explaining. As the partial areas are explained in order, the projected images also change in succession, which prevents the audience from getting bored.

According to the foregoing conventional technique, the partial areas of a page image are displayed in the automatically-analyzed order.

For example, in the case of giving a presentation or explaining a product, the speaker may wish to flexibly select explanation contents or change the order of explanation according to the audience to give the best explanation to the audience, not just giving the same explanation in the same order every time. Such a demand, however, has been difficult to meet.

Specifically, to check the display order of partial areas of a page image, the partial areas have needed to be actually enlarged and displayed in order. The display order of all the partial areas in a page image has therefore not been able to be wholly comprehended, and the partial areas of which the user wishes to change the display order could not have been identified.

According to the foregoing conventional technique, intuitive operations for changing the display order of partial areas from a mobile terminal such as a smartphone and a tablet have not been provided.

SUMMARY OF THE INVENTION

According to an aspect of the present invention, an image display apparatus includes a first display control unit configured to enlarge and display a display target object on a screen, the display target object among a plurality of objects included in an image, and in a case where an instruction to display on the screen an object other than the display target object being displayed on the screen is received from a user, to display a next object to be displayed on the screen according to the instruction, a second display control unit configured to display the image including the plurality of objects on the screen, and, in a case where the instruction from the user is received while display of the screen is controlled by the first display control unit, display an image on the screen with respect to each of the plurality of objects, the image indicating display order of a corresponding object to be enlarged and displayed on the screen, and a changing unit configured to change the display order by receiving an operation of the user on the screen for which display is controlled by the second display control unit.

According to another aspect of the present invention, the display order of partial areas in a page image can be wholly comprehended, and the display order of arbitrary partial areas can be changed with a simple operation.

Further features of the present invention will become apparent from the following description of exemplary embodiments with reference to the attached drawings.

BRIEF DESCRIPTION OF THE DRAWINGS

FIG. 1A is a hardware configuration diagram of an image display apparatus, and FIG. 1B is a block diagram of an image processing program.

FIG. 2 is a diagram illustrating contents and page images.

FIGS. 5A, 5B, and 5C are partial area management tables of partial area data.

FIG. 6 is a flowchart of mode control processing.

FIGS. 10A, 10B, 10C, 10D, 10E and 10F are diagrams each illustrating an example of screen transitions during the presentation processing.

FIGS. 17A and 17B illustrate a partial area management table according to the second exemplary embodiment.

FIGS. 20A and 20B each illustrate a partial area management table according to the third exemplary embodiment.

DESCRIPTION OF THE EMBODIMENTS

Figure 3:
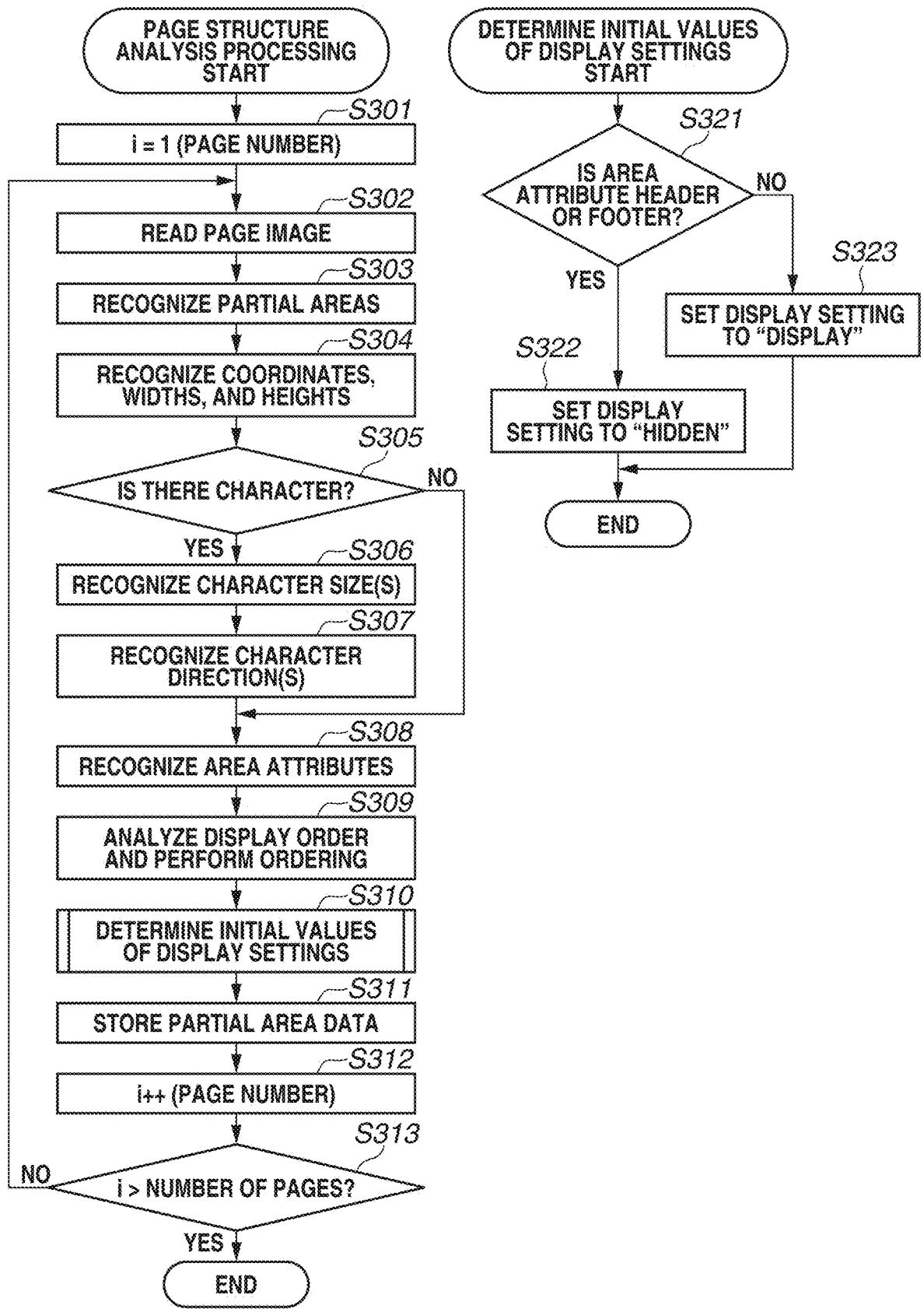
FIG. 3 is a flowchart set of page structure analysis processing.

A first exemplary embodiment of the present invention will be described below with reference to the drawings.
(Hardware Configuration of Image Display Apparatus)

A hardware configuration diagram of an image display apparatus 100 will be described with reference to FIG. 1A.

The image display apparatus 100 includes a central processing unit (CPU) 101, a random access memory (RAM) 102, a read-only memory (ROM) 103, a hard disk drive (HDD) 104, and a display unit 105.

The CPU 101 executes an image processing program stored in the ROM 103 and performs display control of a page image on the display unit 105 of the image display apparatus 100. Processing blocks implemented by the image processing program will be described with reference to FIG. 1B.

The display unit 105 includes a touch panel display, which is constituted by providing a touch panel on a liquid crystal display (LCD) device capable of displaying an image.

The CPU 101 can detect, for example, the following touch operations and states of the touch panel. Touching the touch panel with a finger or pen (hereinafter, referred to as a tap-in). Touching the touch panel with a finger or pen and keeping still without moving (hereinafter, referred to as a long tap). Moving a finger or pen in touch with the touch panel (hereinafter, referred to as a drag). Releasing a finger or pen from the touch panel (hereinafter, referred to as a tap-out). Moving a finger or pen on the touch screen as if sweeping in a certain direction (hereinafter, referred to as a swipe).

The display unit 105 notifies the CPU 101 of such touch operations and position coordinates on a regular basis. On the basis of the notified information, the CPU 101 determines which touch operation is performed on the touch panel. The CPU 101 can also determine the moving direction of the finger or pen moving on the touch panel both in terms of vertical and horizontal components on the touch panel, based on a change in the position coordinates.

The touch panel may be of any system, including resistive film, capacitive, surface acoustic wave, infrared, electromagnetic induction, image recognition, and optical sensor systems.

The RAM 102 is a memory which is used when the image processing program is executed.

The HDD 104 is a storage unit which is used when the image processing program reads and writes data. Data processed by the image processing program will be referred to as contents. Contents and a page image(s) included therein will be described with reference to FIG. 2.

The display unit 105 is a screen for displaying the page image(s). The display unit 105 will be described with reference to FIGS. 8A, 8B, and 8C.
(Block Diagram of Image Processing Program)

Next, a block diagram of the image processing program will be described with reference to FIG. 1B.

The processing blocks of the image processing program include a page structure analysis unit 111, a partial area management unit 112, a mode control unit 113, a presentation processing unit 114, and an edit processing unit 115.

The roles of the processing blocks will be described.

The page structure analysis unit 111 performs structure analysis processing on the page images. The structure analysis processing refers to processing for automatically analyzing a plurality of partial areas (objects) in a page image according to document components such as text and figures included in the page image. The structure analysis processing of the page images will be described below with reference to the flowchart set of FIG. 3.

The document components for the page structure analysis unit 111 to process refer to elements laid out in a document, such as a title in the body, the body, a header, a footer, a figure, and the background. The document components will be described below with reference to FIGS. 4A to 4C.

Information about the partial areas obtained by the execution of the structure analysis processing will be referred to as partial area data.

The partial area data is data about the partial areas, including display order, coordinates, widths and heights, and area attributes of the partial areas in the page image. The area attributes correspond to classification of the document components in the partial area data.

Details of the partial area data will be described below with reference to FIGS. 4A to 5C.

The partial area management unit 112 manages the partial area data. A partial area management table is a table for managing a plurality of pieces of partial management data. The partial area management table will be described below with reference to FIGS. 5A, 5B, and 5C.

The mode control unit 113 controls a display mode of the contents. Display modes of the contents include a presentation mode and an edit mode. Such mode control processing will be described with reference to FIGS. 6, 7A, 7B, 7c and 7D.

The presentation processing unit 114 performs processing in the presentation mode. Such processing will be referred to as presentation processing. The presentation processing is processing for displaying partial areas in a page image at respective display enlargement factors of the partial areas in order, according to user operations. Information used for display, such as the display order, coordinates, widths, and heights of the partial areas, is specified by the partial area data.

Figure 9A:
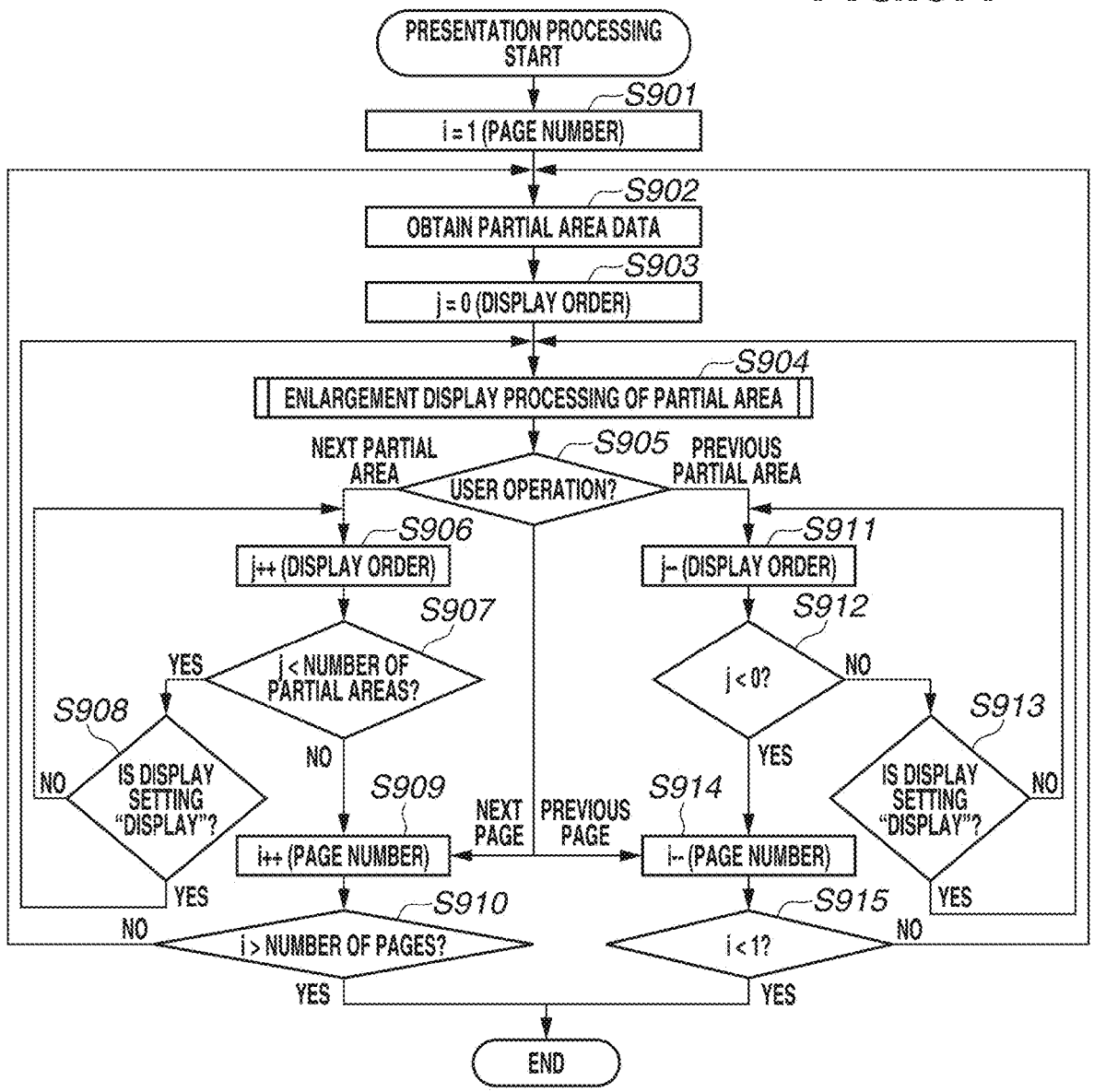
FIG. 9A is a flowchart of presentation processing.
Figure 9B:
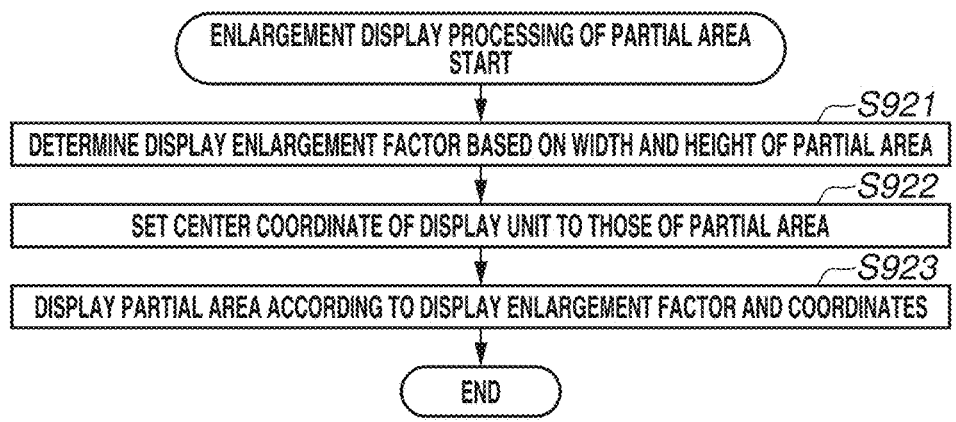
FIG. 9B is a flowchart of enlargement display processing of a partial area.

The presentation processing performed by the presentation processing unit 114 and enlargement display processing of the partial areas will be described below with reference to the flowcharts of FIGS. 9A and 9B, respectively.

The edit processing unit 115 performs processing in the edit mode. Such processing will be referred to as edit processing. The edit processing is processing for changing the display order of partial areas in a page image and changing display settings of the partial areas.

Figure 11:
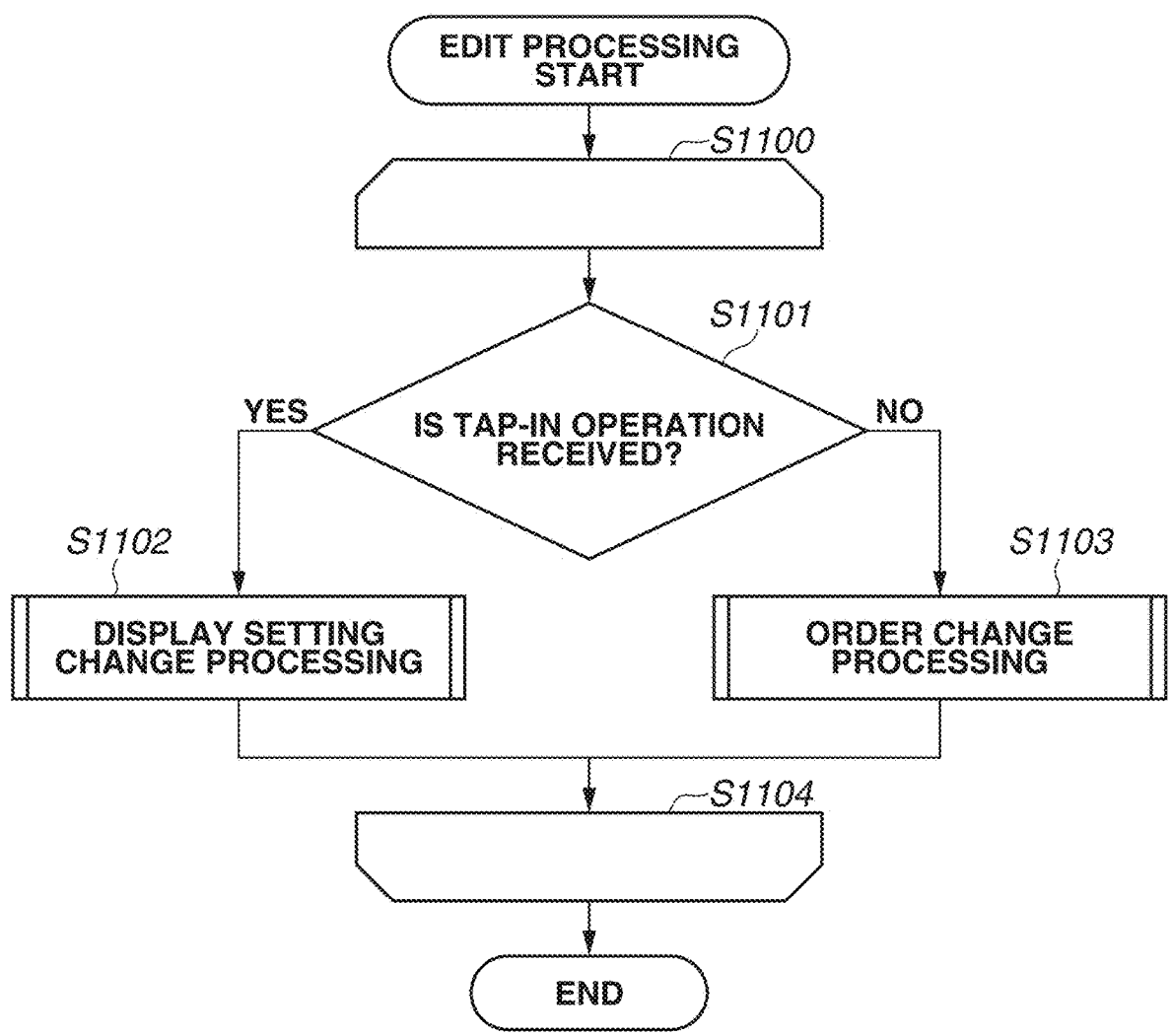
FIG. 11 is a flowchart of edit processing.

The edit processing performed in the edit mode will be described below with reference to FIG. 11. Display setting change processing of the partial areas will be described below with reference to FIG. 12. Order change processing of the partial areas will be described below with reference to FIG. 13.
(Contents and Page Images)

The contents processed by the image processing program and the page images included therein will be described with reference to FIG. 2.

As illustrated in FIG. 2, contents 200 include a plurality of page images 201 to 20N. The number of pages of the contents 200 is N.

The contents 200 are a document file to be handled by ordinary information processing apparatuses. The page images 201 to 20N each are a different one of pages of the document file. For example, the page images 201 to 20N are in a raster image format such as a Joint Photographic Experts Group (JPEG) file and a Tagged Image File Format (TIFF) file.

(Page Structure Analysis Processing)
(Page Image and Example of Structure Analysis)

The structure analysis processing of the page images (page structure analysis processing) performed by the page structure analysis unit 111 will be described with reference to the flowchart set of FIG. 3. The structure analysis processing of a page image is processing for automatically analyzing a plurality of partial areas in the page image according to document components in the page image.

An example of the page images to be processed is the page images 201 to 20N included in the contents 200 of FIG. 2.

Here, the page image 201 of the first page in the contents 200 will be used as an example of a page image to be processed. The same page image 201 will be described in detail with reference to FIG. 4A.

Figure 4A:
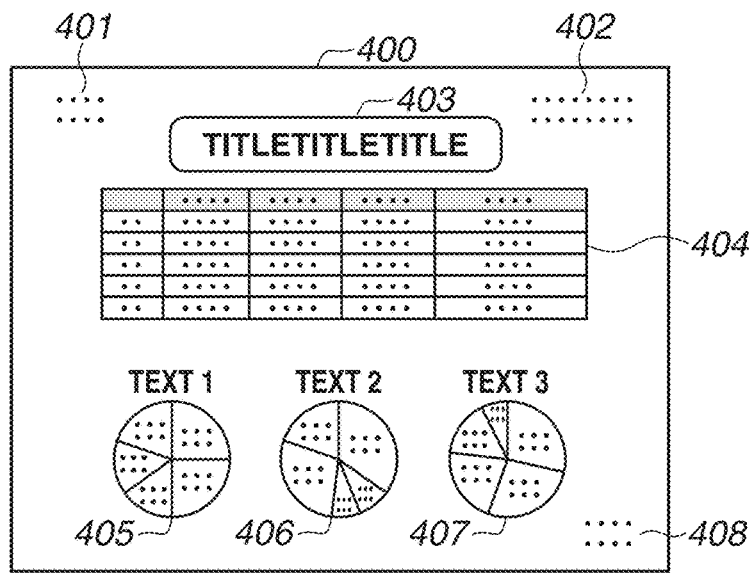
FIGS. 4A, 4B, and 4C are diagrams each illustrating a page image and an example of a structure analysis result.

As illustrated in FIG. 4A, the page image 201 includes a background 400, a header 401, a header 402, a title 403, a table 404, a FIG. 405, a FIG. 406, a FIG. 407, a FIG. 407, and a footer 408 which are laid out as document components.

The page structure analysis unit 111 performs the structure analysis processing of a page image on all the pages of the contents 200 in order. More specifically, the page structure analysis unit 111 starts processing at the first page, and processes the next page after the completion of the process for the first page. Such processing is repeated until the last page.

The processing of each step of FIG. 3 is executed and implemented by the CPU 101 in the image display apparatus 100.

In step S301, the page structure analysis unit 111 sets the number of the page to be processed to a variable i. The variable i is an incremental index for performing processing on all the pages. The page structure analysis unit 111 initially sets the number of the first page, 1, to the variable i.

In step S302, the page structure analysis unit 111 reads the page image of the ith page of the contents 200 stored in the HDD 104 of the image display apparatus 100.

In step S303, the page structure analysis unit 111 analyzes to recognize partial areas of the read page image according to document components.

Figure 4B:
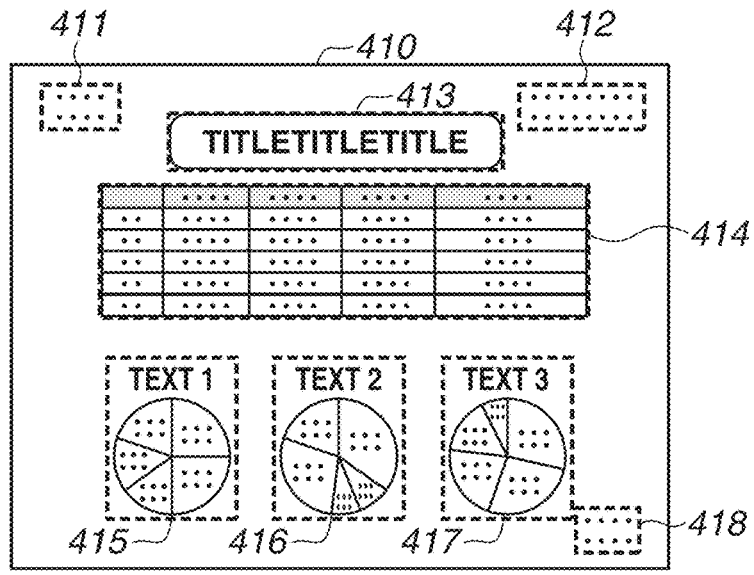

For example, FIG. 4B illustrates a result obtained by the page structure analysis unit 111 automatically analyzing partial areas of the page image of FIG. 4A according to the foregoing document components. In FIG. 4B, the partial areas resulting from the page structure analysis are illustrated by dotted lined rectangles.

In FIGS. 4A and 4B, the background 400 is illustrated to have been automatically analyzed as a partial area 410. Similarly, the header 401 is illustrated to have been automatically analyzed as a partial area 411. The header 402 is illustrated to have been automatically analyzed as a partial area 412. The title 403 is illustrated to have been automatically analyzed as a partial area 413. The table 404 is illustrated to have been automatically analyzed as a partial area 414. The FIG. 405 is illustrated to have been automatically analyzed as a partial area 415. The FIG. 406 is illustrated to have been automatically analyzed as a partial area 416. The FIG. 407 is illustrated to have been automatically analyzed as a partial area 417. The footer 408 is illustrated to have been automatically analyzed as a partial area 418.

In step S304, the page structure analysis unit 111 analyzes to recognize the coordinates, widths, and heights of the respective partial areas.

Figure 4C:
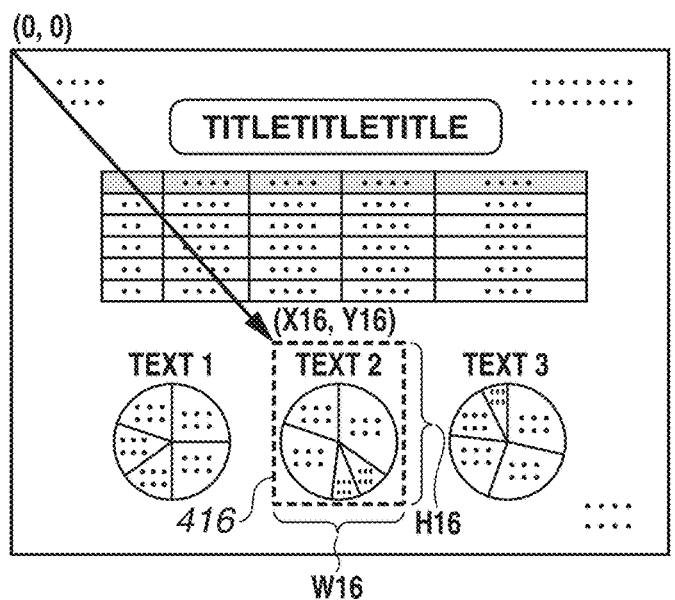

The coordinates, widths, and heights of the partial areas will be described by using the partial area 416 in FIG. 4C as an example. The coordinates are expressed in a coordinate system with the top left of the partial area 400 having an area attribute of the background (area having the same range as that of the entire page image) as an origin.

The coordinates of the partial area 416 are represented by a distance X16 from the origin to the top left coordinates of the partial area 416 in an X-axis direction and a distance Y16 from the origin to the top left coordinates of the partial area 416 in a Y-axis direction. The width and height of the partial area 416 are represented by a length W16 in the X-axis direction of the partial area 416 and a length H16 in the Y-axis direction of the partial area 416.

In step S305, the page structure analysis unit 111 performs optical character recognition (OCR) processing and determines whether there is a character in the partial areas. If it is determined that there is a character (YES in step S305), the processing proceeds to step S306. If it is determined that there is no character (NO in step S305), the processing proceeds to step S308.

In step S306, the page structure analysis unit 111 obtains a character size or character sizes from the result of the OCR processing.

In step S307, the page structure analysis unit 111 analyzes to recognize a character direction or character directions from the result of the OCR processing. A character direction refers to a writing direction which indicates whether characters are written horizontally or vertically.

In step S308, the page structure analysis unit 111 analyzes to recognize the area attributes of the respective partial areas. The area attributes indicate attributes corresponding to the document components. Examples of the attributes include a title, body, header, footer, table, figure, and background.

In step S309, the page structure analysis unit 111 analyzes the display order of the partial areas and performs ordering. The display order is determined according to the character direction(s), coordinates, widths, and heights of the partial areas obtained in the previous steps. Basically, if the character direction is horizontal, the page structure analysis unit 111 orders the partial areas from one lying at the top left to one at the bottom right in the page image. If the character direction is vertical, the page structure analysis unit 111 orders the partial areas from ones lying at the top right to ones at the bottom left in the page image.

In the example of FIG. 4B, the character direction is horizontal. Accordingly, the page structure analysis unit 111 determines display order of the partial areas from one lying at the top left to one at the bottom right in the page image, for example, in such a manner that the partial area 411 is the first in the display order, the partial area 412 is the second in the display order, and the partial area 413 is the third in the display order. The page structure analysis unit 111 then orders the partial area 414 as the fourth in the display order, the partial area 415 as the fifth in the display order, the partial area 416 as the sixth in the display order, the partial area 417 as the seventh in the display order, and the partial area 418 as the eighth in the display order. The partial area 410 as the background is the zeroth in the display order because the partial area 410 is displayed at the beginning of the page display. In the presentation mode, partial areas recognized to be the background are excluded from the enlargement display of the partial areas.

The display order of the partial areas can be changed through the order change processing which will be described with reference to FIG. 13. In step S310, the page structure analysis unit 111 determines initial values of the display settings for the partial areas. The processing is described in steps S321 to S323.

In step S321, the page structure analysis unit 111 determines whether the area attribute of each partial area obtained in the preceding step S308 is a header or footer. If it is determined that the area attribute is a header or footer (YES in step S321), the processing proceeds to step S322. If it is determined that the area attribute is other than a header or footer (NO in step S322), the processing proceeds to step S323.

In step S322, the page structure analysis unit 111 sets the display setting of the partial area in process to "hidden".

In step S323, the page structure analysis unit 111 sets the display setting of the partial area in process to "display".

The display setting will be described below with reference to FIGS. 9A and 9B. The display setting is a setting for determining whether to enlarge and display the corresponding partial areas. Header(s) and footer(s) in a page image are supplementary information that is usually attached to all the pages in the contents. The initial values of the display settings of headers and footers are therefore set to "hidden". The display settings of the partial areas can be changed by the display setting change processing to be described below with reference to FIG. 12.

In step S311, the page structure analysis unit 111 stores the information about the partial areas recognized in the previous steps as partial area data. In fact, the page structure analysis unit 111 notifies the partial area management unit 112 to store the partial area data.

In step S312, the page structure analysis unit 111 increments the variable i to process the next page.

In step S313, the page structure analysis unit 111 determines whether the variable i exceeds the number of pages of the contents 200 in process. If it is determined that the variable i does not exceed the number of pages (NO in step S313), the processing returns to step S302. In step S302, the page structure analysis unit 111 obtains the page image of the next page and performs the subsequent processing.

If the variable i exceeds the number of pages (YES in step S313), the structure analysis processing of the page images ends, since all the pages of the page images to be processed have been completed.

(Management of Partial Area Data)

The partial area data and the partial area management table will be described with reference to FIGS. 5A to 5C.

The partial area management unit 112 manages the partial area data by using the partial area management table.

The partial area management unit 112 stores the partial area management table in the RAM 102 and/or the HDD 104 which are storage units of the image display apparatus 100.

The partial area management table of FIGS. 5A to 5C will be described.

The partial area management table illustrated in FIGS. 5A to 5C includes partial area data items which are arranged in a row direction.

The partial area data items include a page number 501, a partial area number 502, coordinates 503, a width and height 504, an area attribute 505, a display setting 506, a character direction 507, a character size 508, and display order 509.

The page number 501 is the page number of the page image in which the partial area is included.

The partial area number 502 is a number for identifying the partial area.

The partial area can be uniquely identified in the contents 200 by using the page number 501 and the partial area number 502.

The coordinates 503 are the coordinates at the top left of the partial area. The width and height 504 are the width and height of the partial area. The coordinates, width, and height of a partial area are illustrated in FIG. 4C.

The area attribute 505 indicates the attribute corresponding to the document component. Possible attributes include a title, body, header, footer, table, figure, and background.

The display setting 506 indicates a setting about whether to display or hide the partial area in the presentation processing. If the partial area is to be enlarged and displayed in the presentation processing, the display setting 506 is set to "display". If the partial area is to be hidden in the presentation processing, the display setting 506 is set to "hidden". The display setting change processing of the partial areas will be described below with reference to FIG. 12.

The character direction 507 indicates the direction (writing direction) of characters if the partial area includes any characters. If the characters are horizontally written, the character direction 507 is set to "horizontal". If the characters are vertically written, the character direction 507 is set to "vertical". The character size 508 indicates a character size if the partial area includes any characters.

The display order 509 is the display order of the partial area in the page image of one page. The edit processing of the display order will be described below with reference to FIGS. 13 to 14A, 14B, 14C, 14D, 14E, and 14F.

The column direction of the partial area management table will be described.

A row of the partial area management table corresponds to a single piece of partial area data. For example, the page image of FIG. 4B includes nine partial areas 410 to 418, which are managed in nine rows of the partial area table of FIG. 5A to 5C.

The partial area management table similarly manages all the partial area data included in all the page images 201 to 20N of the contents 200.

The partial area data is used in the mode control processing, the presentation processing, the edit processing, and the order change processing described below.

(Mode Control Processing)

The mode control processing is processing for selecting one of a plurality of display modes and displaying contents.

In the present exemplary embodiment, the display modes include at least the presentation mode and the edit mode.

The presentation mode is a mode in which the presentation processing for displaying a partial area of the page image at the enlargement factor corresponding to the partial area is performed according to the set display order. For example, the presentation mode is used in giving a presentation in a conference room or explaining products in face-to-face business negotiations.

The edit mode is a mode in which the display order of the partial areas constituting a page image and/or the display settings of the partial areas are changed prior to the display of the page images in the presentation mode.

Figure 7A:
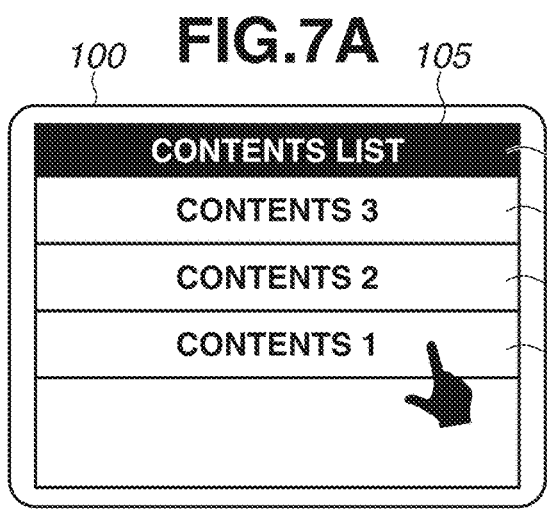
FIGS. 7A, 7B, 7C, and 7D are diagrams each illustrating an example of screen transitions during the mode control processing.

The mode control processing is performed when contents are displayed. The mode control processing is performed when desired contents are selected from a contents list with a user operation. FIG. 7A illustrates a contents list. FIG. 7A illustrates a state where a contents list 700 lists a plurality of contents 701 to 703 which are stored in the HDD 104 of the image display apparatus 100.

Contents are selected from the contents list 700 in response to a user's instruction such as the user's tap-in operation. As illustrated in FIG. 7A, if a tap-in operation on contents 1 (701) is received, the image display apparatus 100 performs the mode control processing on the contents 1 and displays the contents 1 (701).

Here, assume that the contents 1 (701) include the contents 200 illustrated in FIG. 2. FIG. 5A illustrates the partial area data obtained by the page structure analysis of the contents 1.

The mode control processing will be described with reference to the flowchart of FIG. 6 and FIGS. 7A, 7B, 7C and 7D.

In step S601, the mode control unit 113 accepts a user operation. Here, the display unit 105 is displaying the contents list 700 as illustrated in FIG. 7A.

The user operation to be received in step S601 is either one of two types of operations, a "presentation mode start instruction" or an "edit mode start instruction".

In step S601, if the mode control unit 113 accepts a "presentation mode start instruction" (YES in step S601), the processing proceeds to step S602. If the mode control unit 113 accepts an "edit mode start instruction" (NO in step S601), the processing proceeds to step S611.

In this embodiment, for example, to give the "presentation mode start instruction", the user selects the contents to be displayed from the contents list 700 by a tap-in operation. To give the "edit mode start instruction", the user selects the contents to be edited from the contents list 700 by a long tap operation.

In step S602, the mode control unit 113 reads the partial area data of the contents of which the selection instruction is received. If the contents 1 (701) are selected as illustrated in FIG. 7A, the mode control unit 113 reads the partial area data of FIG. 5A.

Figure 7C:
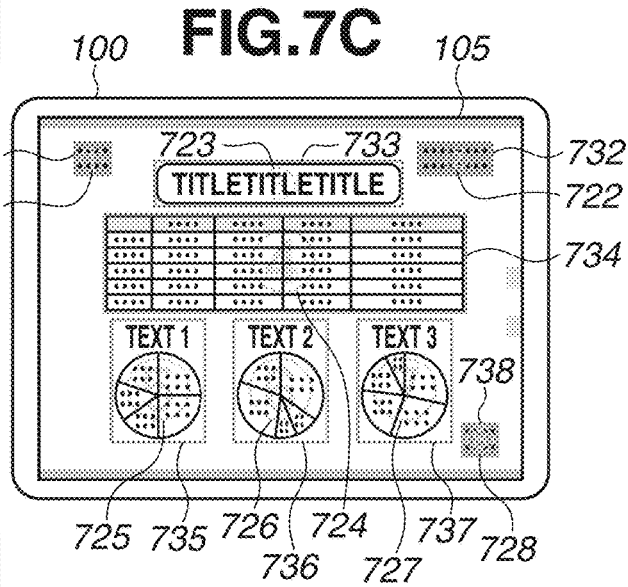
Figure 7B:
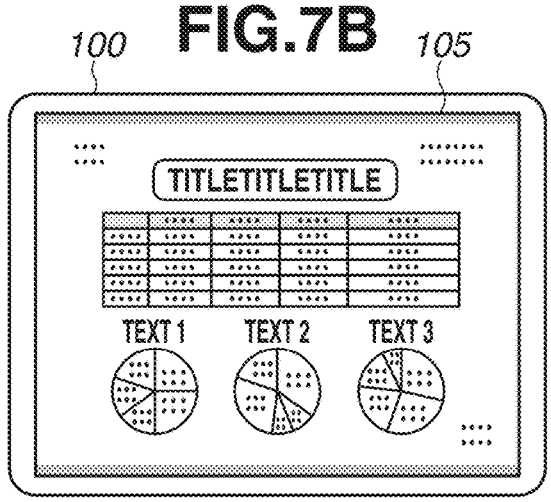

In step S603, the mode control unit 113 displays a page image based on the partial area data read in the previous step. FIG. 7B illustrates the screen of the display unit 105 at this time. If the "presentation mode start instruction" is received, the mode control unit 113 displays the page image and ends the mode control processing. The subsequent presentation processing will be described below with reference to the flowchart of FIG. 9A.

Meanwhile, in step S611, the mode control unit 113 reads the partial area data of the contents of which the selection instruction is received. If the contents 1 (701) are selected as illustrated in FIG. 7A, the mode control unit 113 reads the partial area data of FIG. 5A.

In step S612, the mode control unit 113 displays a page image based on the partial area data read in the previous step.

In step S613, the mode control unit 113 displays the display order of the partial areas and frames indicating the ranges of the respective partial areas on the page image displayed in the previous step in a superimposed manner based on the partial area data read by the previous step. FIG. 7C illustrates the screen of the display unit 105 at this time.

The display order of each partial area displayed in a superimposed manner will be referred to as an "order label". The example of FIG. 7C includes order labels 721 to 728. Frames 731 to 738 of the partial areas are also included.

In FIG. 7C, the order label 721 and the frame 731 represent the display order 1, and the frame of the partial area 411, respectively. Similarly, the display label 722 and the frame 732 represent the display order 2, and the frame of the partial area 412. The order label 723 and the frame 733 represent the display order 3, and the frame of the partial area 413. The order label 724 and the frame 734 represent the display order 4, and the frame of the partial area 414. The order label 725 and the frame 735 represent the display order 5, and the frame of the partial area 415. The order label 726 and the frame 736 represent the display order 6, and the frame of the partial area 416. The order label 727 and the frame 737 represent the display order 7, and the frame of the partial area 417. The order label 728 and the frame 738 represent the display order 8, and the frame of the partial area 418.

The partial area 410 having an area attribute of the background refers to the entire page image. Since the partial area 410 is displayed at the beginning of the page display and is excluded from editing such as a change of order, no order label or frame thereof is displayed.

If the "edit mode start instruction" is received, the mode control unit 113 displays the page image, displays the order label and the frame of the respective partial areas in a superimposed manner, and ends the mode control processing. The subsequent edit processing and the order change processing will be described with reference to the flowcharts of FIGS. 11 and 13, respectively.

The user operations to be accepted in step S601 are not limited to the foregoing operations as long as the mode control unit 113 can recognize which mode is selected.

Figure 7D:
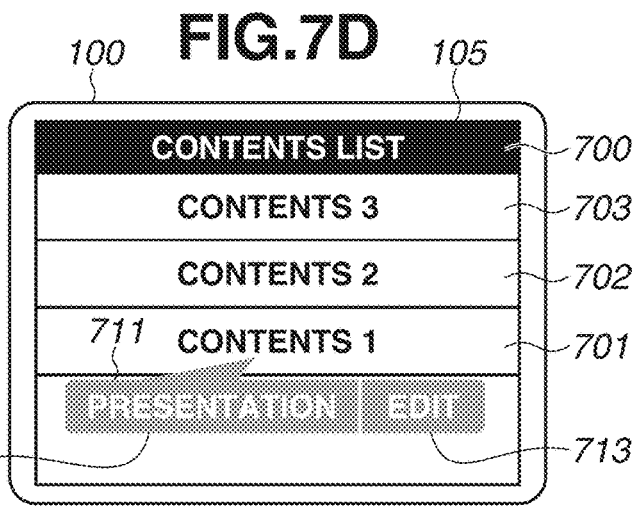

For example, as illustrated in FIG. 7D, the user may long-tap the display portion corresponding to the contents desired to be processed, and then make a tap-in operation on an appeared popup menu 711 for selection. In such a case, if a selection instruction on a presentation button 712 is received, the processing proceeds to step S602. If a selection instruction on an edit button 713 is received, the processing proceeds to step S603.

In the edit mode described above, the order labels and the frames are displayed on the partial areas of the page image in a superimposed manner, which enables the user to wholly comprehend the currently-set display order, and to easily identify a partial area for which the user wishes to change the display order and its display order that the user wishes to change.

Moreover, the contents to be processed can be opened either in the presentation mode or the edit mode. This configuration is beneficial for preventing the user from erroneously making operations of the edit mode in the presentation mode, so that the user's operation mistakes can be suppressed.

Now, the presentation processing for displaying the partial areas of the page image in order in the presentation mode will be described.

The display unit 105 and presentation operations used to describe the presentation processing will initially be described with reference to FIGS. 8A, 8B, and 8C. The presentation processing and the enlargement display processing of the partial areas will be described next with reference to FIGS. 9A and 9B.

(Display Unit and Presentation Operations)

Figure 8A:
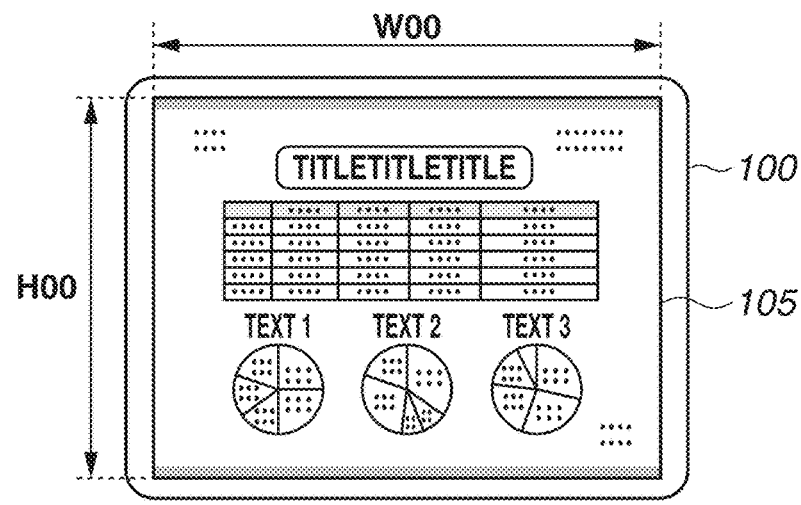
FIGS. 8A, 8B, and 8C are diagrams each illustrating a display unit and presentation operations.

FIG. 8A illustrates the display unit 105 of the image display unit 100. The display unit 105 has a size of W00 in width and H00 in height.

User operations received in the presentation mode will be referred to as presentation operations. The presentation operations include at least the following operations.

Figure 8B:
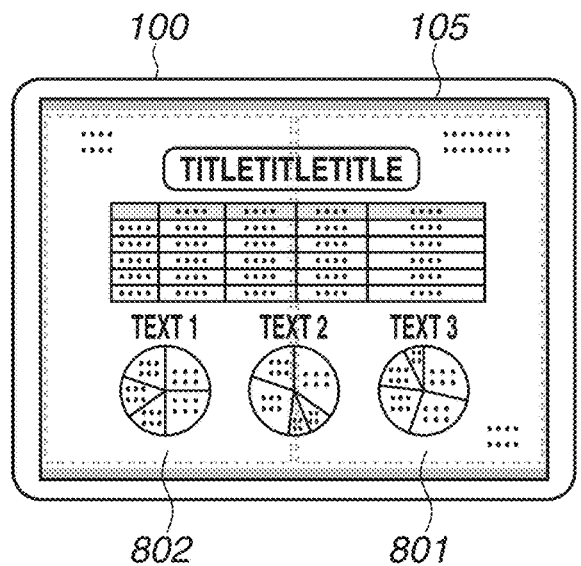

A user operation for displaying a "next partial area" is a tap-in operation on a right half 801 of the display unit 105 as illustrated in FIG. 8B. In a case where such an operation is received, the screen transitions to the next partial area.

A user operation for displaying a "previous partial area" is a tap-in operation on a left half 802 of the display unit 105 as illustrated in FIG. 8B. In a case where such an operation is received, the screen transitions to the previous partial area.

Figure 8C:
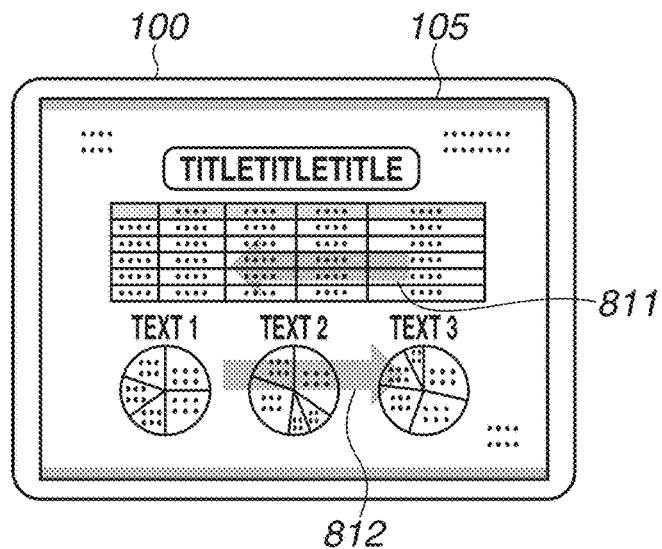

A user operation for displaying a "next page" is a leftward swipe operation 811 on the display unit 105 as illustrated in FIG. 8C. In a case where such an operation is received, the screen transitions to the next page image.

A user operation for displaying a "previous page" is a rightward swipe operation 812 on the display unit 105 as illustrated in FIG. 8C. In a case where such an operation is received, the screen transitions to the previous page image.

The presentation operations are not limited to the foregoing operations. For example, if an on-screen button for displaying a "next partial area" is operated, the screen may transition to the next partial area.

(Presentation Processing)

The presentation processing will be described with reference to the flowchart of FIG. 9A.

The presentation processing is display processing which is sequentially performed on all the partial areas included in all the pages of the contents 200. More specifically, the display processing starts at the zeroth partial area in the display order of the first page, and processes the respective partial areas of the first page according to the display order. After the end of the first page, the display processing is performed on the respective partial areas of the next page. Such processing is repeated until the final page.

In step S901, the presentation processing unit 114 sets the page number of the page to be processed to a variable i. The variable i is an incremental index for performing the processing on all the pages. The presentation processing unit 114 initially sets the number of the first page, 1, to the variable i.

In step S902, the presentation processing unit 114 obtains all the partial area data of the page number that is set to the variable i in the previous step from the partial area management table.

In step S903, the presentation processing unit 114 sets the display order 509 of the partial area to be processed to a variable j. The variable j is an incremental index for performing the enlargement display processing on all the partial areas included in one page. The presentation processing unit 114 initially sets the initial display order 0, to the variable j.

In step S904, the presentation processing unit 114 performs the enlargement display processing of the partial area. The enlargement display processing is processing for displaying the partial area on the display unit 105 at an appropriate display enlargement factor according to the partial area data stored in the partial area management table of FIG. 5A. The enlargement display processing of the partial area will be described with reference to FIG. 9B.

In step S905, the presentation processing unit 114 accepts a user operation. The user operation received here is any one of the operations described with reference to FIGS. 8A, 8B and 8C. Specifically, the presentation processing unit 114 accepts any one of the following: a user operation for displaying a "next partial area", a user operation for displaying a "previous partial area", a user operation for displaying a "next page", and a user operation for displaying a "previous page".

If the user operation for displaying a "next partial area" is received (NEXT PARTIAL AREA in step S905), the processing proceeds to step S906. If the user operation for displaying a "next page" is received (NEXT PAGE in step S905), the processing proceeds to step S909. If the user operation for displaying a "previous partial area" is received (PREVIOUS PARTIAL AREA in step S905), the processing proceeds to step S911. If the user operation for displaying a "previous page" is received (PREVIOUS PAGE in step S905), the processing proceeds to step S914.

In step S906, the presentation processing unit 114 increments the variable j to process the next partial area.

In step S907, the presentation processing unit 114 determines whether the variable j is less than the number of partial areas in the page in process. If the variable j is determined to be less than the number of partial areas (YES in step S907), the processing proceeds to step S908.

In step S908, the presentation processing unit 114 determines the display setting 506 of the partial area data in process. If the display setting 506 is determined to be "display" (YES in step S908), the processing proceeds to step S904. If the display setting 506 is determined to be "hidden" (NO in step S908), the processing proceeds to step S906. In step S906, the presentation processing unit 114 processes the next partial area in the display order.

In step S907, if the variable j reaches the number of partial areas (NO in step S907), the processing proceeds to step S909, since all the partial areas of the page in process have been processed.

In step S909, the presentation processing unit 114 increments the variable i to process the next page.

In step S910, the presentation processing unit 114 determines whether the variable i exceeds the number of pages of the contents 200 in process. If it is determined that the variable i does not exceed the number of pages (NO in step S910), the processing returns to step S902. In step S902, the presentation processing unit 114 obtains the entire partial area data of the next page.

If the variable i is determined to exceed the number of pages (YES in step S910), the presentation processing ends, since all the pages have been processed.

In step S911, the presentation processing unit 114 decrements the variable j to process the previous partial area.

In step S912, the presentation processing unit 114 determines whether the variable j is less than 0. If the variable j is determined to be greater than or equal to (NO in step S912), the processing proceeds to step S913. If the variable j is determined to be less than 0 (YES in step S912), the processing proceeds to step S914, since the processing has been completed up to the initial partial area of the page in process.

In step S913, the presentation processing unit 114 determines the display setting 506 of the partial area data in process. If it is determined that the display setting 506 is "display" (YES in step S913), the processing proceeds to step S904. If it is determined that the display setting 506 is "hidden" (NO in step S913), the processing proceeds to step S911.

In step S914, the presentation processing unit 114 decrements the variable i to process the previous page.

In step S915, the presentation processing unit 114 determines whether the variable i is less than 1. If the variable i is determined to be greater than or equal to (NO in step S915), the processing returns to step S902. In step S902, the presentation processing unit 114 obtains the entire partial area data of the previous page. If the variable i is determined to be less than 1 (YES in step S915), the presentation processing ends, since the processing has been completed up to the first page.

Now, the enlargement display processing of a partial area, performed in step S905 of the presentation processing, will be described. Screen transitions of the display unit 105 of the image display apparatus 100 in a case where the presentation processing is performed will be described next.

(Enlargement Display Processing of Partial Area)

The enlargement display processing of a partial area will be described with reference to the flowchart of FIG. 9B.

This processing is processing for setting an appropriate display enlargement factor and display coordinates of each partial area, and enlarging and displaying the partial area so that the entire partial area fits inside the display unit 105.

In step S921, the presentation processing unit 114 determines the display enlargement factor based on the width and height of the partial area in process, specified by the partial area data corresponding to the partial area in process.

To determine the display enlargement factor, the presentation processing unit 114 once calculates enlargement factors in a width direction and a height direction, respectively, and sets the enlargement factor having a smaller value as the display enlargement factor. For example, in the case of the partial area data in the first row of the partial area management table in FIG. 5A (page number=1, partial area number=0), the presentation processing unit 114 compares the enlargement factor in the width direction, W10/W00, with the enlargement factor in the height direction, H10/H00, and sets the enlargement factor having a smaller value as the display enlargement factor of the partial area.

In step S922, the presentation processing unit 114 sets center coordinates of the display unit 105 to the center coordinates of the partial area based on the coordinates specified by the partial area data in process. As a result, the partial area is displayed in the center of the display unit 105.

For example, in the case of the partial area data in the first row of the partial area management table in FIG. 5A (page number=1, partial area number=0), the presentation processing unit 114 sets the center coordinates (W00/2, H00/2) of the display unit 105 to the center coordinates (X10+(W10/2), Y10+(H10/2)) of the partial area.

In step S923, the presentation processing unit 114 displays the partial area on the display unit 105 according to the display enlargement factor and the display coordinates set in the previous steps. The enlargement display processing of the partial area ends.

(Example of Screen Transitions of Presentation Processing)

Screen transitions of the display unit 105 in a case where the presentation processing is performed will be described with reference to FIGS. 10A, 10B, 10C, 10D, 10E, and 10F.

The partial area data (first to ninth rows of FIG. 5A) obtained by performing the page structure analysis processing (FIG. 3) on the page image 201 of the first page of the contents 200 will be used as an example. The page image 201 includes the nine partial areas 410 to 418 of FIG. 4B. In step S902 of the presentation processing (FIG. 9A), the presentation processing unit 114 obtains the entire partial area data of the page image 201 of the first page.

In step S903, the presentation processing unit 114 initially sets 0 to the variable j intended for the display order, and processes the partial area that is the zeroth in the display order (page number=1, partial area number=0). This data is the data of the first row of the partial area management table (FIG. 5A), with an area attribute of the background which refers to the entire page image 201. In step S904, the presentation processing unit 114 performs the enlargement display processing of the partial area 410. FIG. 10A illustrates the display unit 105 at this time.

Then, according to user operation received in step S905, the presentation processing unit 114 displays each of the partial areas in the page image 201.

As an example for the processing according to the present exemplary embodiment, for simplicity, screen transitions in a case where only user operations for displaying a "next partial area" are received will be described. In such a case, the screen transitions are performed in order of FIGS. 10A, 10B, 10C, 10D, 10E, and 10F. The screen transitions are sequentially described below.

In FIG. 10A, the variable j is equal to 0. If, in step S905, a user operation for displaying a "next partial area" is received (NEXT PARTIAL AREA in step S905), the processing proceeds to step S906. In step S906, the presentation processing unit 114 increments the variable j intended for the display order from 0 to 1. The presentation processing unit 114 then processes the partial area 411 (page number=1, partial area number=1) that is the first in the display order.

In step S907, j=1 is determined to be less than the number of partial areas, nine (YES in step S907). The processing proceeds to step S908. In step S908, the display setting 506 of the partial area 411 that is the first in the display order is determined to be "hidden" (NO in step S908). The processing proceeds to step S906, without enlarged display of the partial area 411. In step S906, the presentation processing unit 114 increments the variable j intended for the display order from 1 to 2. The presentation processing unit 114 then processes the partial area 412 (page number=1, partial area number=2) that is the second in the display order.

In step S907, j=2 is determined to be less than the number of partial areas, nine (YES in step S907). The processing proceeds to step S908. In step S908, the display setting 506 of the partial area 412 that is the second in the display order is determined to be "hidden" (NO in step S908). The processing proceeds to step S906 without enlarged display of the partial area 412. In step S906, the presentation processing unit 114 increments the variable j intended for the display order from 2 to 3. The presentation processing unit 114 then processes the partial area 413 (page number=1, partial area number=3) that is the third in the display order.

In step S907, j=3 is determined to be less than the number of partial areas, nine (YES in step S907). The processing proceeds to step S908. In step S908, the display setting 506 of the partial area 413 that is the third in the display order is determined to be "display" (YES in step S908). The processing proceeds to step S904.

In step S904, the presentation processing unit 114 performs the enlargement display processing of the partial area 413 that is the third in the display order. FIG. 10B illustrates the display unit 105 at this time.

In the state of FIG. 10B and the variable j is equal to three, if, in step S905, a user operation for displaying a "next partial area" is received (NEXT PARTIAL AREA in step S905), the processing proceeds to step S906. In step S906, the presentation processing unit 114 increments the variable j intended for the display order from 3 to 4. The presentation processing unit 114 then processes the partial area 414 (page number=1, partial area number=4) that is the fourth in the display order.

In step S907, j=4 is determined to be less than the number of partial areas, nine (YES in step S907). The processing proceeds to step S908. In step S908, the display setting 506 of the partial area 414 that is the fourth in the display order is determined to be "display" (YES in step S908). The processing proceeds to step S904. In step S904, the presentation processing unit 114 performs the enlargement display processing of the partial area 414. FIG. 10C illustrates the display unit 105 at this time.

In the state of FIG. 10C and the variable j is equal to 4, if, in step S905, a user operation for displaying a "next partial area" is received (NEXT PARTIAL AREA in step S905), the processing proceeds to step S906. In step S906, the presentation processing unit 114 increments the variable j used for the display order from 4 to 5. The presentation processing unit 114 then processes the partial area 415 (page number=1, partial area number=5) that is the fifth in the display order.

In step S907, j=5 is determined to be less than the number of partial areas, nine (YES in step S907). The processing proceeds to step S908. In step S908, the display setting 506 of the partial area 415 that is the fifth in the display order is determined to be "display" (YES in step S908). The processing proceeds to step S904. In step S904, the presentation processing unit 114 performs the enlargement display processing of the partial area 415. FIG. 10D illustrates the display unit 105 at this time.

In the state of FIG. 10D and the variable j is equal to 5, if, in step S905, a user operation for displaying a "next partial area" is received (NEXT PARTIAL AREA in step S905), the processing proceeds to step S906. In step S906, the presentation processing unit 114 increments the variable j used for the display order from 5 to 6. The presentation processing unit 114 then processes the partial area 416 (page number=1, partial area number=6) that is the sixth in the display order.

In step S907, j=5 is determined to be less than the number of partial areas, nine (YES in step S907). The processing proceeds to step S908. In step S908, the display setting 506 of the partial area 416 that is the sixth in the display order is determined to be "display" (YES in step S908). The processing proceeds to step S904. In step S904, the presentation processing unit 114 performs the enlargement display processing of the partial area 416. FIG. 10E illustrates the display unit 105 at this time.

In the state of FIG. 10E and the variable j is equal to 6, if, in step S905, a user operation for displaying a "next partial area" is received (NEXT PARTIAL AREA in step S905), the processing proceeds to step S906. In step S906, the presentation processing unit 114 increments the variable j used for the display order from 6 to 7. The presentation processing unit 114 then processes the partial area 417 (page number=1, partial area number=7) that is the seventh in the display order.

In step S907, j=7 is determined to be less than the number of partial areas, nine (YES in step S907). The processing proceeds to step S908. In step S908, the display setting 506 of the partial area 417 that is the seventh in the display order is determined to be "display" (YES in step S908). The processing proceeds to step S904. In step S904, the presentation processing unit 114 performs the enlargement display processing of the partial area 417. FIG. 10F illustrates the display unit 105 at this time.

In the state of FIG. 10F and the variable j is equal to 7, if, in step S905, a user operation for displaying a "next partial area" is received (NEXT PARTIAL AREA in step S905), the processing proceeds to step S906. In step S906, the presentation processing unit 114 increments the variable j used for the display order from 7 to 8. The presentation processing unit 114 then processes the partial area 418 (page number=1, partial area number=8) that is the eighth in the display order.

In step S907, j=7 is determined to be less than the number of partial areas, nine (YES in step S907). The processing proceeds to step S908. In step S908, the display setting 506 of the partial area 418 that is the eighth in the display order is determined to be "hidden" (NO in step S418). The processing proceeds to step S906. In step S906, the presentation processing unit 114 increments the variable j used for the display order from 8 to 9. In step S907, j=9 is determined to be greater than or equal to the number of partial areas, nine (NO in step S907). The processing proceeds to step S909. The processing thus proceeds to the next page.

Now, the edit processing performed in the edit mode will be described.

The edit processing includes at least the display setting change processing and the order change processing.

The display setting change processing is processing for changing whether each partial area is to be displayed or hidden. The display setting change processing will be described with reference to FIG. 12.

The order change processing is processing for changing the display order of partial areas. The order change processing will be described with reference to FIG. 13. After that, an example of screen transitions in a case where the order change processing is performed will be described with reference to FIGS. 14A to 14F.

(Edit Processing)

The edit processing will be described with reference to FIG. 11.

The edit processing is processing performed in the edit mode (FIGS. 6, 7A, 7B, 7C and 7D).

In the edit mode, the edit processing unit 115 repeats the processing of steps S1100 to S1104.

In step S1101, the edit processing unit 115 accepts a user operation on the display unit 105. If a tap-in operation is received (YES in step S1101), the processing proceeds to step S1102. If a long-tap operation is received (NO in step S1101), the processing proceeds to step S1103.

In step S1102, the edit processing unit 115 performs the display setting change processing on the partial area to be processed. The display setting change processing will be described with reference to FIG. 12.

In step S1103, the edit processing unit 115 performs the order change processing on the partial area to be processed. The order change processing will be described with reference to FIG. 13.

While the edit processing unit 115 performs the display setting change processing if a tap-in operation is received, and performs the order change processing if a long tap operation is received, the user operations are not limited to such operations. Any operations may be used as long as the edit processing unit 115 can recognize which operation is made on the partial area to be processed.

(Display Setting Change Processing)

The display setting change processing is processing performed in the edit mode (FIGS. 6, 7A, 7B, 7C, and 7D). The display setting change processing is processing for changing the display setting of a partial area.

The display setting of the partial area refers to data (506 in FIG. 5A) included in the partial area data. The display setting is a setting for determining whether to enlarge and display the partial area or hide the partial area in the presentation processing.

In the edit mode, the display unit 105 expresses the display settings of partial areas, for example, with the color inside the frames of the partial areas. As illustrated in FIG. 7C, the frames of partial areas with a display setting of "display" are displayed with a transparent inside. The frames of partial areas with a display setting of "hidden" are displayed with a semitransparent inside, i.e., the inside of the frame is grayed out.

Specifically, FIG. 7C illustrates a state in which the partial area data of FIG. 5A is displayed in the edit mode. In the partial area data of FIG. 5A, the partial areas 413, 414, 415, 416, and 417 are ones with a display setting of "display".

Their frames, namely, frames 723, 724, 725, 726, and 727 are displayed with a transparent inside.

In the partial area data of FIG. 5A, the partial areas 411, 412, and 418 are ones with a display setting of "hidden". Their frames, namely, frames 721, 722, and 728 are each displayed with a semitransparent inside, i.e., the inside of the frame is grayed out.

In the present exemplary embodiment, the partial areas with a display setting of "display" and the ones with a display setting of "hidden" are expressed by using different colors inside the frames. However, the method of expression is not limited thereto.

For example, the partial areas with a display setting of "display" and those with a display setting of "hidden" may be displayed in different densities or with different decorations. Any method of expression may be used as long as the two types of partial areas can be identifiably displayed.

Figure 12:
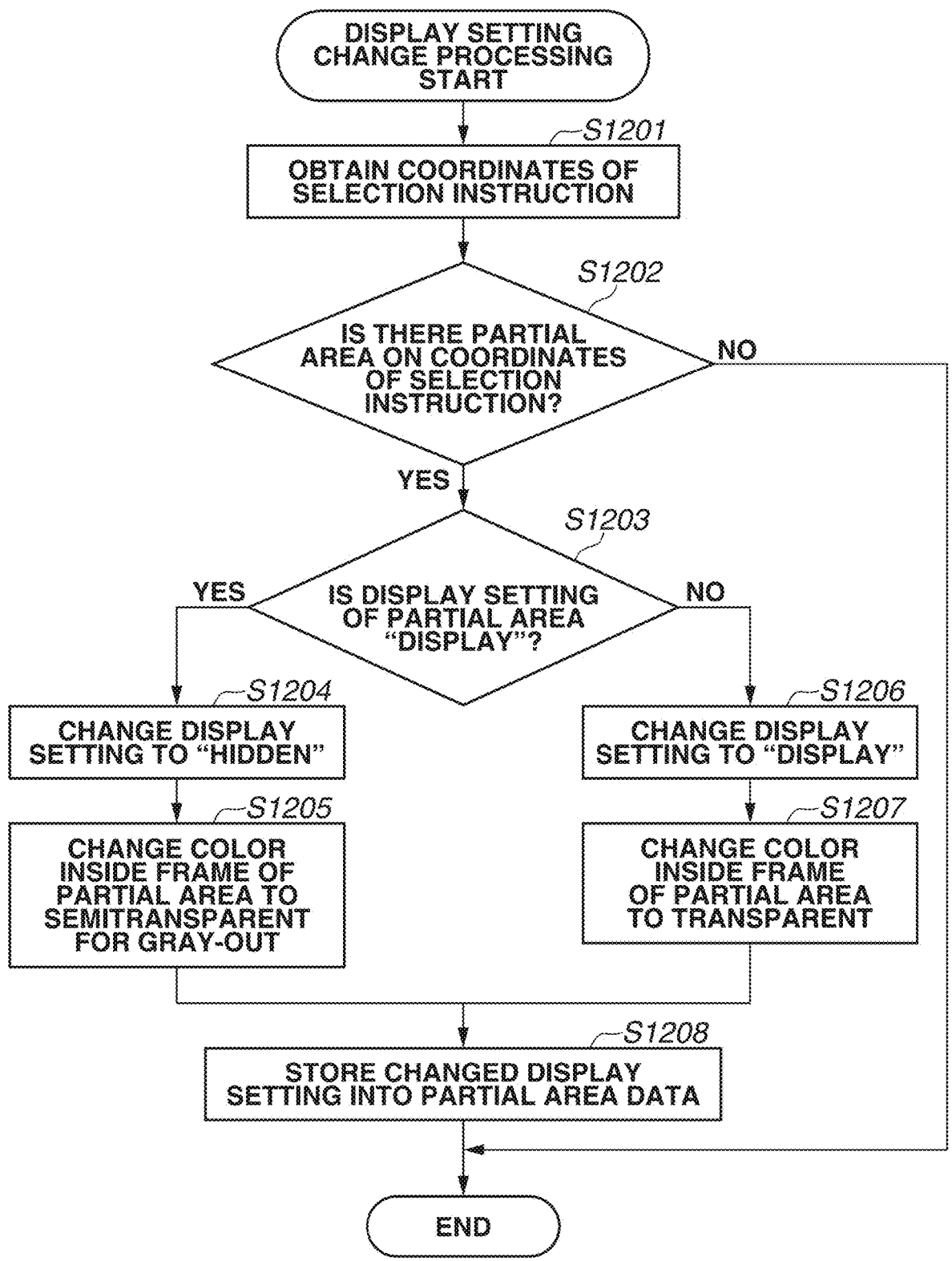
FIG. 12 is a flowchart of display setting change processing.

The processing for changing the display setting of each partial area set in such a manner will be described with reference to the flowchart of FIG. 12.

In step S1201, the edit processing unit 115 obtains the coordinates processed in response to the user's tap-in operation received in step S1101 of the edit processing as coordinates of a selection instruction.

In step S1202, the edit processing unit 115 performs a hit determination whether there is a partial area on the coordinates of the selection instruction. Such a hit determination is performed with respect to all the partial areas included in the page image(s) except the one having an area attribute of the background. The background is excluded from the hit determination since the background refers to the entire page image and its display setting is "display".

If there is a partial area on the coordinates of the selection instruction (YES in step S1202), the processing proceeds to step S1203. If not (NO in step S1202), the display setting change processing ends.

In step S1203, the edit processing unit 115 determines the display setting of the partial area of which the hit determination is made in the previous step, based on the partial area data. If the display setting of the partial area is "display" (YES in step S1203), the processing proceeds to step S1204. If the display setting of the partial area is "hidden" (NO in step S1203), the processing proceeds to step S1205.

In step S1204, the edit processing unit 115 changes the display setting of the partial area from "display" to "hidden".

In step S1205, the edit processing unit 115 changes the color inside the frame of the partial area from transparent to semitransparent for gray-out. The changed color is not limited that of gray-out, and the method of display may be changed to any that indicates "hidden".

In step S1206, the edit processing unit 115 changes the display setting of the partial area from "hidden" to "display".

In step S1207, the edit processing unit 115 changes the color inside the frame of the partial area from semitransparent for gray-out to transparent. The changed color is not limited to transparent, and the method of display may be changed to any that indicates "display".

In step S1208, the edit processing unit 115 stores the changed display setting into the partial area data.

(Order Change Processing)

The order change processing of partial areas will be described with reference to the flowchart of FIG. 13.

The order change processing is processing for changing the display order of partial areas.

Steps S1300 and S1313 represent a beginning and an end of repeat processing, respectively. In step S1301, the edit processing unit 115 receives a user operation on the display unit 105. If a "start instruction" is received (START INSTRUCTION in step S1301), the processing proceeds to step S1302. If a "movement instruction" is received (MOVEMENT INSTRUCTION in step S1301), the processing proceeds to step S1311. If a "finalization instruction" is received (FINALIZATION INSTRUCTION in step S1301), the processing proceeds to step S1321.

If a start of pressing of the screen with a tap-in operation is detected, the edit processing unit 115 determines that a "start instruction" is received.

If a tap-in operation is detected and a drag operation is further detected, the edit processing unit 115 determines that a "movement instruction" is received.

If a drag operation ends and a tap-out operation is detected, the edit processing unit 115 determines that a "finalization instruction" is received.

In step S1302, the edit processing unit 115 obtains the coordinates when a tap-in operation that is the "start instruction" is made to start a drag operation. Such coordinates will be referred to as start instruction coordinates. In step S1303, the edit processing unit 115 performs a hit determination whether there is a partial area on the start instruction coordinates. The hit determination is performed with respect to all the partial areas included in the page image(s) except the one having an area attribute of the background. The background is excluded from the hit determination since the background refers to the entire page image and is excluded from a change of order.

If there is a partial area on the start instruction coordinates (YES in step S1303), the processing proceeds to step S1304. If not (NO in step S1303), the processing proceeds to step S1313. In step S1313, the processing returns to step S1300 which is the beginning of the repeat processing.

In step S1304, the edit processing unit 115 temporarily stores the partial area on the start instruction coordinates as a partial area A.

In step S1311, the edit processing unit 115 obtains the coordinates of the position on the page image where the drag operation is made with the "movement instruction". Such coordinates will be referred to as movement instruction coordinates.

In step S1312, the edit processing unit 115 sets the movement instruction coordinates as center coordinates of a numeral (hereinafter, referred to as an order label) that indicates the display order of the partial area A, and moves the order label. Such a display state will be described with reference to FIGS. 14A, 14B, 14C, 14D, 14E and 14F.

In step S1321, the edit processing unit 115 obtains the coordinates when the pressing of the screen with the drag operation is ended by the "finalization instruction", i.e., when the tap-out operation is detected. Such coordinates will be referred to as finalization instruction coordinates.

In step S1322, the edit processing unit 115 performs a hit determination whether there is a partial area on the finalization instruction coordinates. If there is a partial area at the finalization instruction coordinates (YES in step S1322), the processing proceeds to step S1323. If not (NO in step S1322), the edit processing unit 115 returns the order label to the original position of the partial area A (not illustrated). The processing proceeds to step S1313. In step S1313, the processing returns to the beginning of the repeat processing.

In step S1323, the edit processing unit 115 temporarily stores the partial area on the finalization instruction coordinates as a partial area B.

In step S1324, the edit processing unit 115 inserts the display order of the partial area A (the numeral of the order label) as the display order of the partial area B.

In step S1325, the edit processing unit 115 stores the updated display order into the partial area management table in an overwriting manner.

(Example of Screen Transitions During Order Change Processing)

Figure 13:
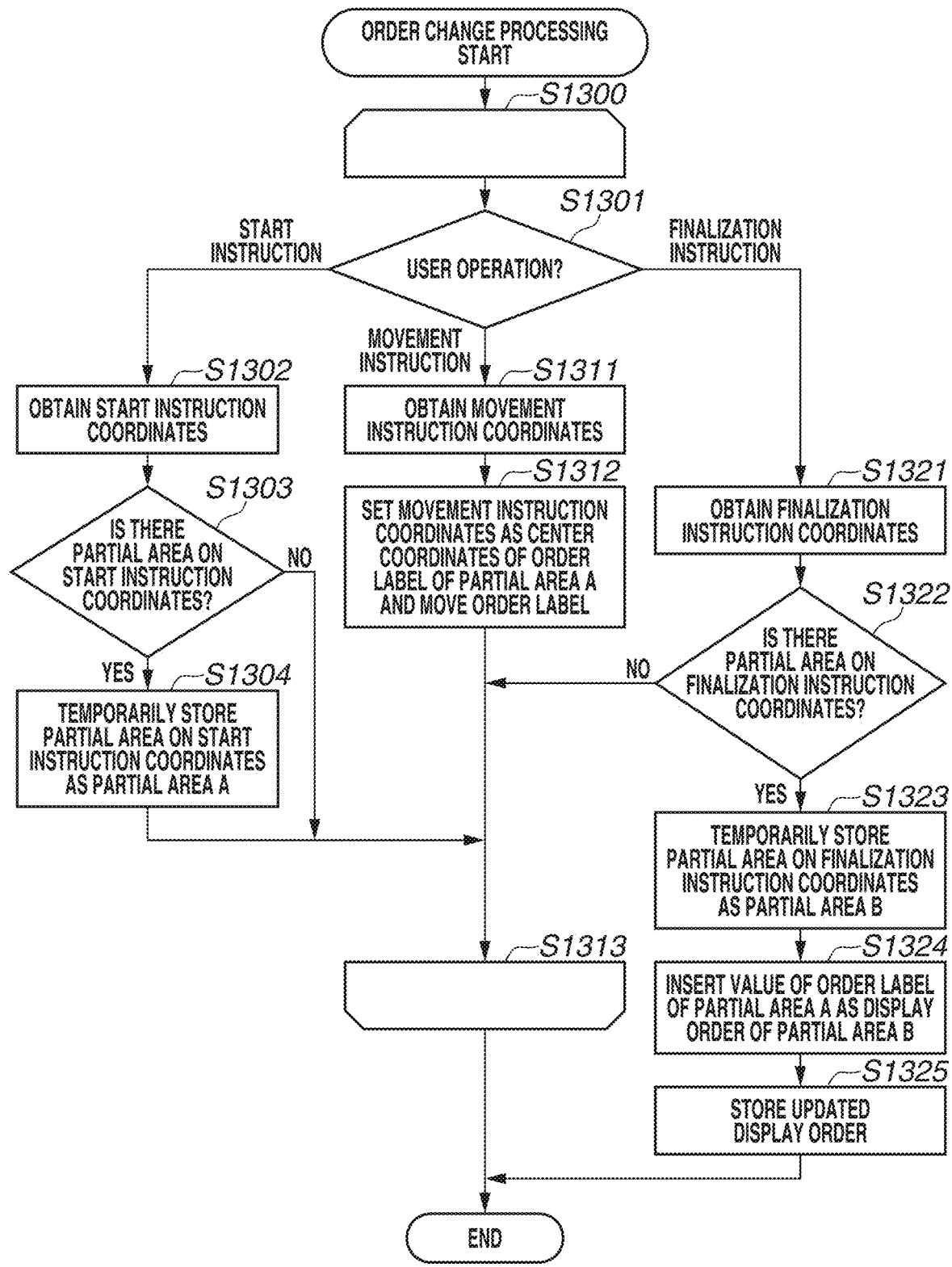
FIG. 13 is a flowchart of order change processing.

Screen transitions of the display unit 105 when the order change processing illustrated in FIG. 13 is performed will be described with reference to FIGS. 14A, 14B, 14C, 14D, 14E and 14F.

The page image 201 of the first page of the contents 200 will be used as an example. FIG. 4B illustrates the nine partial areas 410 to 418 which are automatically analyzed by performing the page structure analysis processing (FIG. 3) on the page image 201. The partial area data of the partial areas 410 to 418 corresponds to the first to ninth, nine rows of FIG. 5A.

The three partial areas 415, 416, and 417 of FIG. 4B will be used as an example of a change of order. The partial areas 415, 416, and 417 are the fifth, sixth, and seventh in the display order from the left to right. In the following example, the display order of the partial areas 415, 416, and 417 is changed to be the fifth, sixth, and seventh from the right to left. In other words, an example will be described where the display order of the partial areas 415, 416, and 417 is changed so that the display order of the partial areas is 417, 416, and 415.

Figure 14A:
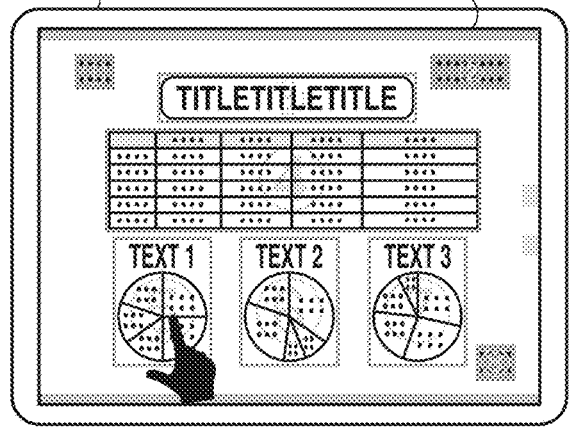
FIGS. 14A, 14B, 14C, 14D, 14E and 14F are diagrams each illustrating an example of screen transitions during the order change processing.

As described with reference to FIGS. 6, 7A, 7B, 7C and 7D, in a case where the contents 200 are opened in the edit mode, the page image 201 is displayed with the order labels and frames of the partial areas superimposed as illustrated in FIG. 14A.

In the state illustrated in FIG. 14A, assume that a drag operation on the partial area 415 (pie chart of text 1) is received. In such a case, the processing proceeds from step S1301 to step S1302 when the drag operation is started. The edit processing unit 115 here obtains start instruction coordinates which represent the start position of pressing of the screen with the drag operation.

In step S1303, the edit processing unit 115 performs a hit determination between the start instruction coordinates and the partial areas 411 to 418 (page number=1, partial area number=1 to page number=1, partial area number=8 in FIG. 5A) in the page image 201, excluding the partial area 410 having an area attribute of the background. Since the start instruction coordinates fall within the partial area 415 (page number=1, partial area number=5, display order=5 in FIG. 5A), the processing proceeds to step S1304. In step S1304, the edit processing unit 115 sets the partial area 415 as a partial area A.

Figure 14B:
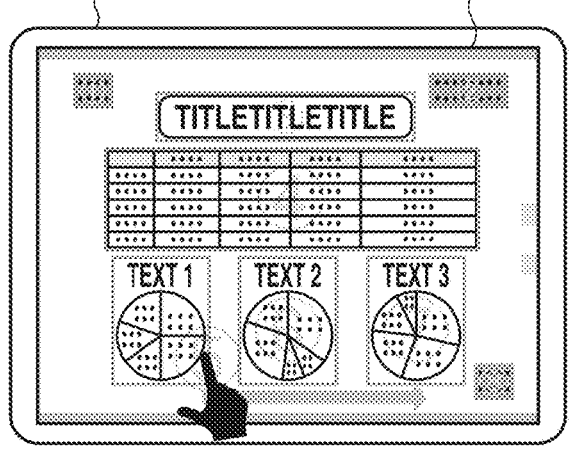

Subsequently, if the pressing position of the drag operation is moved by a user operation, the processing proceeds to step S1311. In step S1311, the edit processing unit 115 obtains the coordinates of the drag operation as movement instruction coordinates. In step S1312, the edit processing unit 115 sets the movement instruction coordinates as the center coordinates of the order label of the partial area A and moves the order label. FIG. 14B illustrates the state of display here.

Figure 14C:
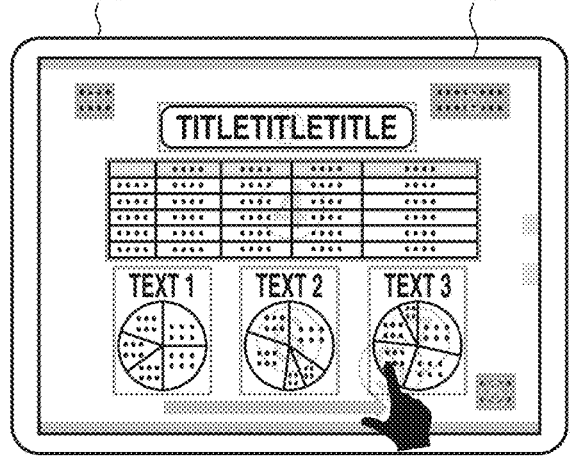

Then, assume that the pressing position of the drag operation is moved up to the position of the partial area 417 (pie chart of text 3) by a user operation. FIG. 14C illustrates the state of display here. If the pressing of the screen with the drag operation is ended by a user operation, then in step S1301, the edit processing unit 115 determines that a finalization instruction is received. The processing proceeds to step S1321. In step S1321, the edit processing unit 115 obtains the end coordinates of the drag operation as finalization instruction coordinates.

In step S1322, the edit processing unit 115 performs a hit determination between the finalization instruction coordinates and the partial areas 411 to 418 (page number=1, partial area number=1 to page number=1, partial area number=8 in FIG. 5A) in the page image 201, excluding the partial area 410 having an area attribute of the background. Since the finalization instruction coordinates fall within the partial area 417 (page number=1, partial area number=7, display order=7 in FIG. 5A), the processing proceeds to step S1323. In step S1323, the edit processing unit 115 sets the partial area 417 as a partial area B.

Figure 14D:
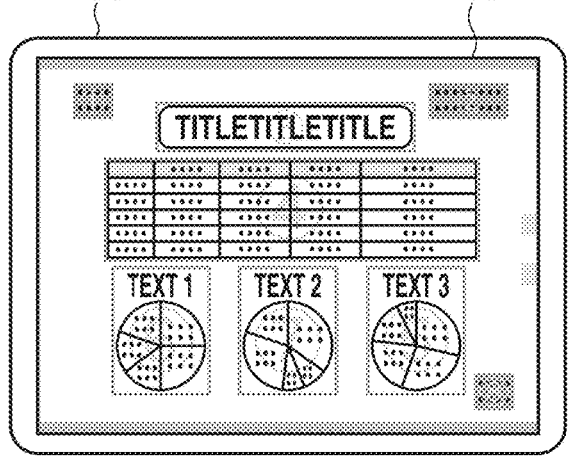

In step S1323, the edit processing unit 115 inserts the value of the order label of the partial area 415 serving as the partial area A, 5, into the display order 509 of the partial area 417 serving as the partial area B. By the insertion, the partial area 417 (page number=1, partial area number=7 in FIG. 5A) serving as the partial area B is changed to the fifth in the display order, and the display order of the subsequent partial areas is incremented by one each. More specifically, the partial area 415 (page number=1, partial area number=5 in FIG. 5A) which has been the fifth in the display order is changed to the sixth in the display order. The partial area 416 (page number=1, partial area number=6 in FIG. 5A) which has been the sixth in the display order is changed to the seventh in the display order. FIG. 5B illustrates the partial area management table in such a state. FIG. 14D illustrates the state of display. As illustrated in FIG. 14D, the partial areas 415, 416, and 417 are the sixth, seventh, and fifth in the display order from the left to right.

In a case where, in step S1322, there is no partial area in the position corresponding to the finalization instruction coordinates (hit determinations with respect to the partial areas excluding the partial area 410 having an area attribute of the background are all false), the order label returns to the position of the original partial area 415. In other words, the state of display returns to that of FIG. 14A.

Next, assume that a drag operation on the partial area 415 (pie chart of text 1) is received in the state of FIG. 14A. In such a case, the processing proceeds from step S1301 to step S1302 when the pressing of the screen by the drag operation is started. In step S1302, the edit processing unit 115 obtains the start instruction coordinates which represent the start position of the pressing of the screen by the drag operation.

In step S1303, the edit processing unit 115 performs a hit determination between the start instruction coordinates and the partial areas 411 to 418 (page number=1, partial area number=1 to page number=1, partial area number=8 in FIG. 5A) in the page image 201, excluding the partial area 410 having an area attribute of the background. Since the start instruction coordinates fall within the partial area 415 (page number=1, partial area number=5, display order=6 in FIG. 5A), the processing proceeds to step S1304. In step S1304, the edit processing unit 115 sets the partial area 415 as a partial area A.

Subsequently, in a case where the pressing position of the screen with the drag operation is moved by a user operation, the processing proceeds to step S1311. In step S1311, the edit processing unit 115 obtains the coordinates of the drag operation as movement instruction coordinates. In step S1312, the edit processing unit 115 sets the movement instruction coordinates as the center coordinates of the order label of the partial area A and moves the order label thereof (not illustrated).

Figure 14E:
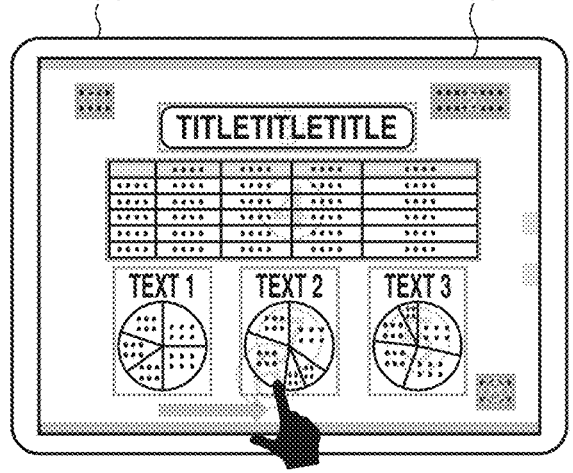

Assume that the user then makes the drag operation up to the position of the partial area 416 (pie chart of text 2). FIG. 14E illustrates the state of display here.

In a case where the pressing of the screen with the drag operation is ended by a user operation, then in step S1301, the edit processing unit 115 determines that a finalization instruction is received. The processing proceeds to step S1321. In step S1321, the edit processing unit 115 obtains the end coordinates of the drag operation as the finalization instruction coordinates.

In step S1303, the edit processing unit 115 performs a hit determination between the finalization instruction coordinates and the partial areas 411 to 418 (page number=1, partial area number=1 to page number=1, partial area number=8 in FIG. 5A) in the page image 201, excluding the partial area 410 having an area attribute of the background. Since the finalization instruction coordinates fall within the partial area 416 (page number=1, partial area number=6, display order=7 in FIG. 5A), the processing proceeds to step S1323. In step S1323, the edit processing unit 115 sets the partial area 416 as a partial area B.

Figure 14F:
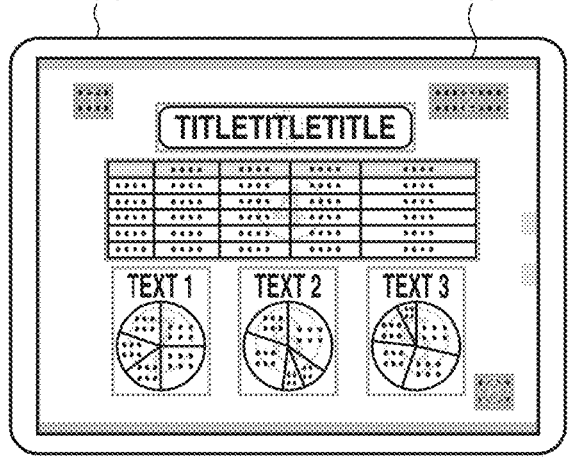

In step S1323, the edit processing unit 115 inserts the value of the order label of the partial area 415 serving as the partial area A, 6, into the display order 509 of the partial area 416 serving as the partial area B. By the insertion, the partial area 416 (page number=1, partial area number=7 in FIG. 5A) serving as the partial area B is changed to the sixth in the display order, and the display order of the subsequent partial area is incremented by one. That is, the partial area 415 (page number=1, partial area number=5 in FIG. 5A) which has been the sixth in the display order is changed to the seventh in the display order. FIG. 5C illustrates the partial area management table in such a state. FIG. 14F illustrates the state of display. As illustrated in FIG. 14F, the partial areas 415, 416, and 417 are the seventh, sixth, and fifth in the display order from the left to right.

Through the foregoing processing, the example of the user-desired order change is achieved. If the order-changed partial area data illustrated in FIG. 5C is used to perform the presentation processing illustrated in FIGS. 9A and 10A, 10B, 10C, 10D, 10E, and 10F, the resulting display order is FIGS. 10A, 10B, 10C, 10F, 10E, and 10D.

As described above, the present exemplary embodiment can be used to change the display order of partial areas in a page image with simple, intuitive operations.

Specifically, order labels and frames are displayed on partial areas of a page image in a superimposed manner. The user can thus wholly comprehend the current display order, and easily identify the partial areas to be changed and the order thereof.

Moreover, the user can change the display order of the desired partial areas with intuitive drag operations.

Furthermore, providing of the presentation mode and the edit mode in opening contents is beneficial for preventing the user from erroneously making operations of the edit mode in the presentation mode, so that the user's operation mistakes can be suppressed.

A second exemplary embodiment of the present invention will be described below. The present exemplary embodiment describes order change processing different from that of the first exemplary embodiment.

Figure 15:
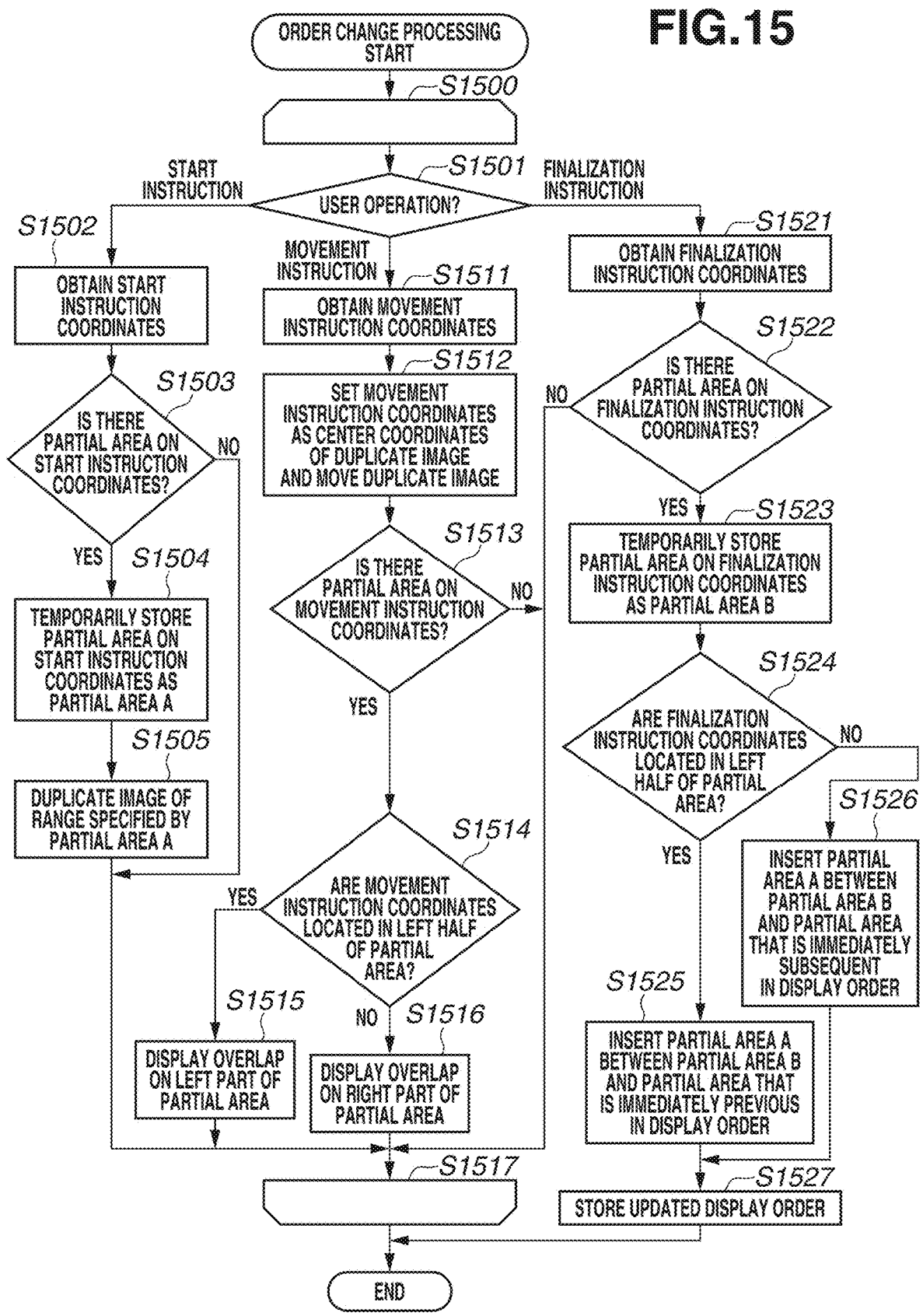
FIG. 15 is a flowchart of order change processing according to a second exemplary embodiment.

A difference between the order change processing described in the first exemplary embodiment with reference to FIG. 13 and the order change processing that will be described in the present second exemplary embodiment with reference to FIG. 15 is first overviewed.

In the order change processing described in the first exemplary embodiment, an order label can be moved to select a certain partial area, and the moved order label is set to the selected partial area.

In the order change processing described in the second exemplary embodiment, not an order label but an image of the partial area for which the display order is desired to be changed is moved. Then, the image of the partial area is inserted between a first image and a second image. With this, the display order of the image of the partial area is set between the display order of the first image and the display order of the second image.

Screen transitions of the display unit 105 of the image display apparatus 100 in a case where the order change processing described with reference to FIG. 15 is performed will be described with reference to FIGS. 18A to 18F.

Since differences from the first exemplary embodiment lie only in the order change processing, other descriptions will be omitted.

(Order Change Processing)

The order change processing of partial areas will be described with reference to the flowchart of FIG. 15 and FIGS. 16A and 16B.

Steps S1500 and S1517 represent a beginning and an end of repeat processing, respectively.

In step S1501, the edit processing unit 115 accepts a user operation on the display unit 105. If a "start instruction" is received (START INSTRUCTION in step S1501), the processing proceeds to step S1502. If a "movement instruction" is received (MOVEMENT INSTRUCTION in step S1501), the processing proceeds to step S1511. If a "finalization instruction" is received (FINALIZATION INSTRUCTION in step S1501), the processing proceeds to step S1521.

If a start of pressing of the screen with a tap-in operation is detected, the edit processing unit 115 determines that a "start instruction" is received.

If a tap-in operation is detected and a drag operation is further detected, the edit processing unit 115 determines that a "movement instruction" is received.

If a drag operation ends and a tap-out operation is detected, the edit processing unit 115 determines that a "finalization instruction" is received.

In step S1502, the edit processing unit 115 obtains coordinates where the tap-in operation, "start instruction", is made to start a drag operation. The coordinates are referred to as start instruction coordinates.

In step S1503, the edit processing unit 115 performs a hit determination whether there is a partial area on the start instruction coordinates. The hit determination is performed with respect to all the partial areas included in the page image except the one having an area attribute of the background. The background is excluded from the hit determination since the background refers to the entire page image and is excluded from a change of order.

If there is a partial area at the start instruction coordinates (YES in step S1503), the processing proceeds to step S1504. If not (NO in step S1503), the processing proceeds to step S1517. In step S1517, the processing returns to step S1500 which is the beginning of the repeat processing.

In step S1504, the edit processing unit 115 temporarily stores the partial area at the start instruction coordinates as a partial area A.

In step S1505, the edit processing unit 115 duplicates the image of the range specified by the partial area A. The resultant will be referred to as a duplicate image.

In step S1511, the edit processing unit 115 obtains the coordinates of the position of the page image where the drag operation is made with the "movement instruction". The coordinates are referred to as movement instruction coordinates.

Figure 18A:
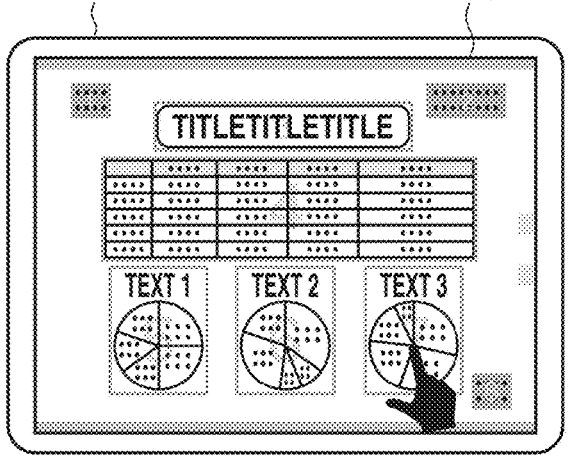
FIGS. 18A, 18B, 18C, 18D, 18E and 18F are diagrams each illustrating an example of screen transitions during the order change processing according to the second exemplary embodiment.
Figure 18B:
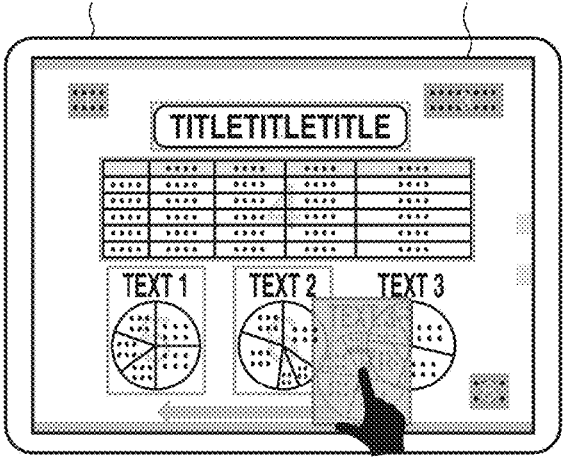

In step S1512, the edit processing unit 115 sets the movement instruction coordinates as center coordinates of the duplicate image and moves the duplicate image. Here, the duplicate image is displayed with shading to indicate a state that the duplicate image is being moved. FIG. 18B illustrates the state of display.

In step S1513, the edit processing unit 115 performs a hit determination whether there is another partial area on the movement instruction coordinates of the duplicate image being moved. If there is a partial area on the movement instruction coordinates (YES in step S1513), the processing proceeds to step S1514. If not (NO in step S1513), the edit processing unit 115 deletes the duplicate image being moved. The processing proceeds to step S1517, and returns to the beginning of the repeat processing. Here, if an overlap (described below) is displayed, the edit processing unit 115 also deletes the overlap (not illustrated).

In step S1514, the edit processing unit 115 determines where, in the partial area for which the hit determination is made in the previous step, the movement instruction coordinates are located. If the movement instruction coordinates are located in a left half of the partial area (YES in step S1514), the processing proceeds to step S1515. If the movement instruction coordinates are located in a right half of the partial area (NO in step S1514), the processing proceeds to step S1516.

In step S1515, the edit processing unit 115 displays an overlap with respect to the duplicate image being moved on a left part of the partial area for which the hit determination is made in step S1513. FIG. 16A illustrates the state of display.

In step S1516, the edit processing unit 115 displays an overlap with respect to the duplicate image being moved on a right part of the partial area for which the hit determination is made in step S1513. FIG. 16B illustrates the state of display.

The display of the overlaps in steps S1515 and S1516 will be described in steps S1524 to S1526.

In step S1521, the edit processing unit 115 obtains coordinates where the end of the pressing with the drag operation which is the "finalization instruction", or tap-out operation, is detected. The coordinates are referred to as finalization instruction coordinates.

In step S1522, the edit processing unit 115 performs a hit determination whether there is a partial area on the finalization instruction coordinates. If there is a partial area at the finalization instruction coordinates (YES in step S1522), the processing proceeds to step S1523. If not (NO in step S1522), the edit processing unit 115 deletes the duplicate image being moved. The processing proceeds to step S1517, and returns to the beginning of the repeat processing.

In step S1523, the edit processing unit 115 temporarily stores the partial area on the finalization instruction coordinates as a partial area B.

In step S1524, the edit processing unit 115 determines where, in the partial area for which the hit determination is made in step S1522, the finalization instruction coordinates are located. If the finalization instruction coordinates are located in a left half of the partial area (YES in step S1524), the processing proceeds to step S1525. If the finalization instruction coordinates are located in a right half of the partial area (NO in step S1524), the processing proceeds to step S1526.

In step S1525, the edit processing unit 115 inserts the partial area A between the partial area B and a partial area that is the immediately previous in the display order. A specific example will be described below with reference to FIGS. 18C and 18D. In step S1526, the edit processing unit 115 inserts the partial area A between the partial area B and a partial area that is the immediately subsequent in the display order. A specific example will be described below with reference to FIGS. 18E and 18F. In step S1527, the edit processing unit 115 stores the updated display order into the partial area management table in an overwriting manner.

In the order change processing according to the present exemplary embodiment, the user can intuitively select which to insert the display order of the partial area A into, i.e., before or after the display order of the partial area B, through the processing of steps S1514 to S1516 and S1524 to S1526.

Screen transitions of the display unit 105 when the foregoing order change processing is performed will be described with reference to FIGS. 18A, 18B, 18C, 18D, 18E and 18F.

(Example of Screen Transitions During Order Change Processing)

Referring to FIGS. 18A, 18B, 18C, 18D, 18E and 18F, screen transitions when the order change processing described with reference to FIGS. 15, 16A, and 16B will be described. The updated partial area management table will be described with reference to FIGS. 17A and 17B.

Assume that the contents 200 are opened in the edit mode as described with reference to FIGS. 6, 7A, 7B, 7C, and 7D. As illustrated in FIG. 18A, order labels and frames are displayed on the partial areas of the page image 201 in a superimposed manner. FIG. 5A illustrates the partial area data here.

The two insertion patterns illustrated in FIGS. 16A and 16B will be described in order.

Figure 16A:
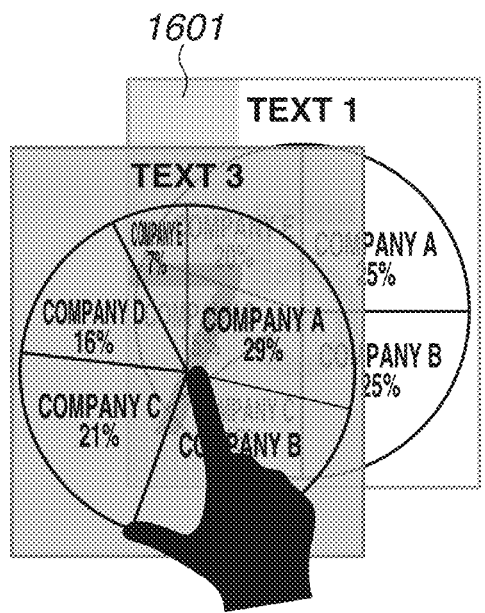
FIGS. 16A and 16B are diagrams each illustrating process of an insertion position determination according to the second exemplary embodiment.

A case where the partial area 417 (pie chart of text 3) for which a movement instruction is received is inserted to the left of the partial area 415 (pie chart of text 1) as illustrated in FIG. 16A will initially be described.

This example describes a case where the partial area 417 (pie chart of text 3) being moved is inserted between the partial area 415 (pie chart of text 1) and the partial area 414 (table) that is the immediately previous in the display order.

In the state illustrated in FIG. 18A, assume that a start of a drag operation, i.e., a tap-in operation on the partial area 417 (pie chart of text 3) is received. In such a case, the processing proceeds from step S1501 to step S1502 when the drag operation is started. In step S1502, the edit processing unit 115 obtains the start instruction coordinates which represent the start position of pressing of the screen with the drag operation.

In step S1503, the edit processing unit 115 performs a hit determination between the start instruction coordinates and the partial areas 411 to 418 (page number=1, partial area number=1 to page number=1, partial area number=8 in FIG. 5A) in the page image 201, excluding the partial area 410 having an area attribute of the background. Since the start instruction coordinates fall within the partial area 417 (page number=1, partial area number=7, display order=7 in FIG. 5A), the processing proceeds to step S1504. In step S1504, the edit processing unit 115 sets the partial area 417 as a partial area A. In step S1505, the edit processing unit 115 duplicates the image of the range specified by the partial area 417. The duplicated image is referred to as a duplicate image.

Subsequently, if the drag operation is moved with a user operation, the processing proceeds to step S1511. In step S1511, the edit processing unit 115 obtains the coordinates of the drag operation as movement instruction coordinates. In step S1512, the edit processing unit 115 sets the movement instruction coordinates as the center coordinates of the duplicate image and moves the duplicate image. The edit processing unit 115 displays the duplicate image with shading to indicate a state that the duplicate image is being moved. FIG. 18B illustrates the state of display here.

FIG. 18B illustrates the state in which the duplicate image is moving according to the drag operation. The duplicate image, the order label, and the frame of the partial area 417 are moving. Since the duplicate image is a duplicate, the image of the original partial area 417 remains displayed on-screen without being cut out.

Figure 18C:
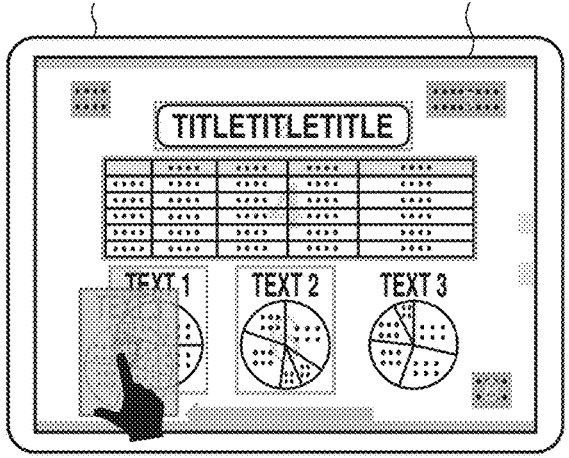

Assume that the user then makes the drag operation to a position of the partial area 415 (pie chart of text 1). FIG. 18C illustrates the state of display. FIG. 16A is an enlarged view thereof.

As illustrated in FIG. 16A, the movement instruction coordinates moving the duplicate image (pie chart of text 3) are located in the left half of the partial area 415 (pie chart of text 1). In steps S1513, S1514, and S1515, the edit processing unit 115 displays an overlap 1601 on the left part of the partial area 415 (pie chart of text 1).

The display of the overlap 1601 allows the user to intuitively understand that if the user ends the drag operation in such a state, the display order of the dragged partial area A can be inserted between that of the partial area 415 on which the overlap 1601 is displayed and that of the partial area 414 that is the immediately previous in the display order.

If the user ends the drag operation in such a state, the post-finalization instruction processing of steps S1521 to S1524 and S1525 is performed. In step S1525, the partial area 417 which is the partial area A is inserted between the partial area 415 which is the partial area B and the partial area 414 which is the immediately previous in the display order.

Figure 18D:
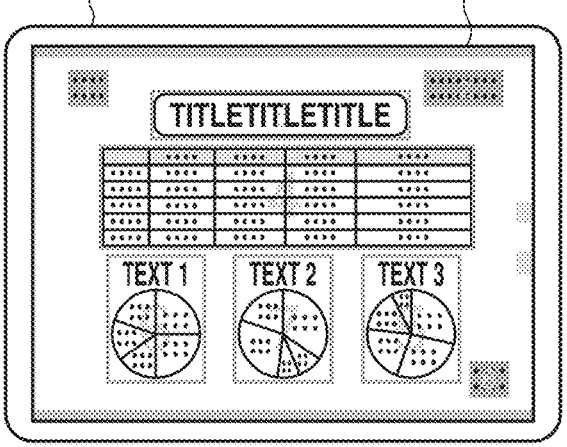

The insertion makes the partial area 417 (page number=1, partial area number=7 in FIG. 5A) the fifth in the display order. The partial area 415 (page number=1, partial area number=5 in FIG. 5A) which has been the fifth in the display order prior to the insertion becomes the sixth in the display order accordingly. The partial area 416 (page number=1, partial area number=6 in FIG. 5A) which has been the sixth in the display order becomes the seventh in the display order. FIG. 17A illustrates the partial area management table in such a state. FIG. 18D illustrates the state of display.

As illustrated in FIG. 18D, the display order of the partial area 414 (table) to the partial area 417 (pie chart of text 3) is changed from 4, 5, 6, 7 to 4, 6, 7, 5. In other words, the display order of the partial area 417 (pie chart of text 3, original display order=7) is inserted between that of the partial area 414 (table, original display order=4) and that of the partial area 415 (pie chart of text 1, original display order=5).

Figure 16B:
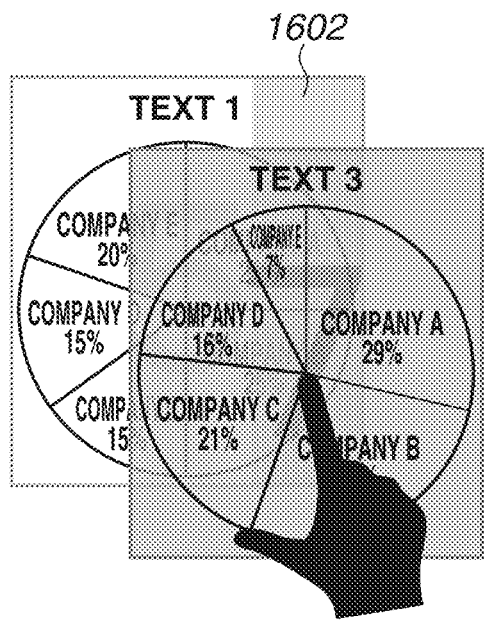

Next, a case where the partial area 417 (pie chart of text 3) for which a movement instruction is received is inserted to the right of the partial area 415 (pie chart of text 1) as illustrated in FIG. 16B will be described.

This example describes a case where the partial area 417 (pie chart of text 3) being moved is inserted between the partial area 415 (pie chart of text 1) and the partial area 416 (pie chart of text 2) that is the immediately subsequent in the display order.

In the state illustrated in FIG. 18A, assume that a start of a drag operation, i.e., a tap-in operation on the partial area 417 (pie chart of text 3) is received and the drag operation is made up to the partial area 415 (pie chart of text 1).

Figure 18E:
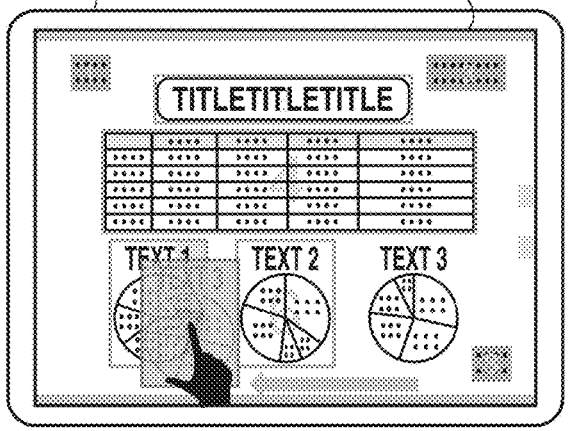

As described above, in steps S1501 to S1505, the edit processing unit 115 duplicates the image of the partial area 417 (pie chart of text 3) lying on the coordinates where the pressing of the screen by the drag operation is started. FIG. 18E illustrates a state where the duplicate image is dragged to the partial area 415. FIG. 16B is an enlarged view thereof.

As illustrated in FIG. 16B, the movement instruction coordinates for moving the duplicate image (pie chart of text 3) are located in the right half of the partial area 415 (pie chart of text 1). In steps S1513, S1514, and S1516, the edit processing unit 115 displays an overlap 1602 on a right part of the partial area 415 (pie chart of text 1).

The display of the overlap 1602 allows the user to intuitively understand that if the user ends the drag operation in such a state, the display order of the dragged partial area A can be inserted between that of the partial area 415 on which the overlap 1602 is displayed and that of the partial area 416 that is the immediately subsequent in the display order.

If the user ends the drag operation in such a state, the post-finalization instruction processing of steps S1521 to S1524 and S1526 is performed. In step S1526, the partial area 417 which is the partial area A is inserted between the partial area 415 which is the partial area B and the partial area 416 which is the immediately subsequent in the display order.

Figure 18F:
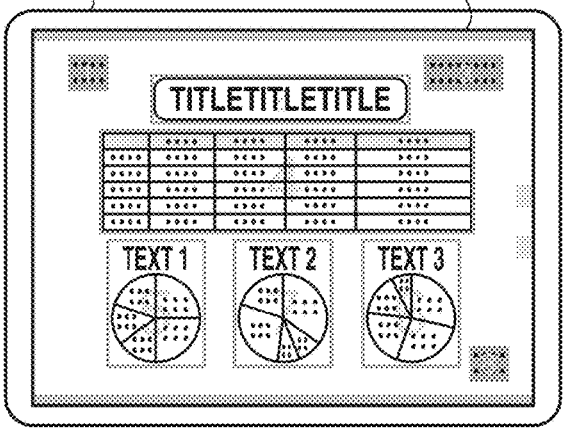

The insertion makes the partial area 417 (page number=1, partial area number=7 in FIG. 5A) the sixth in the display order. The partial area 416 (page number=1, partial area number=6 in FIG. 5A) which has been the sixth in the display order becomes the seventh in the display order accordingly. FIG. 17B illustrates the partial area management table in such a state. FIG. 18F illustrates the state of display.

As illustrated in FIG. 18F, the display order of the partial area 415 (pie chart of text 1) to the partial area 417 (pie chart of text 3) is changed from 5, 6, 7 to 5, 7, 6. In other words, the display order of the partial area 417 (pie chart of text 3, original display order=7) is inserted between that of the partial area 415 (pie chart of text 1, original display order=5) and that of the partial area 416 (pie chart of text 2, original display order=6).

As described above, the present exemplary embodiment has demonstrated a method different from that of the first exemplary embodiment, concerning a change of order of the partial areas of a page image.

This configuration enables selection as to which the display order of a partial area on which the movement instruction is received is changed to, before or after a partial area that is the movement destination, depending on whether the partial area is inserted to the left or right of the partial area that is the movement destination.

Even in the present exemplary embodiment, the display order of the partial areas of a page image can thus be changed with simple, intuitive operations.

As in the first exemplary embodiment, providing the presentation mode and the edit mode in opening contents can prevent the user from erroneously making operations of the edit mode in the presentation mode, so that the user's operation mistakes can be suppressed.

A third exemplary embodiment will be described below. The present exemplary embodiment describes order change processing different from that of the foregoing exemplary embodiments. Only differences from the first and second exemplary embodiments will be described.

Unlike the methods for changing the display order of partial areas to a certain order as in the first and second exemplary embodiments, the present exemplary embodiment describes a method for incrementing and decrementing the display order.

Figure 19:
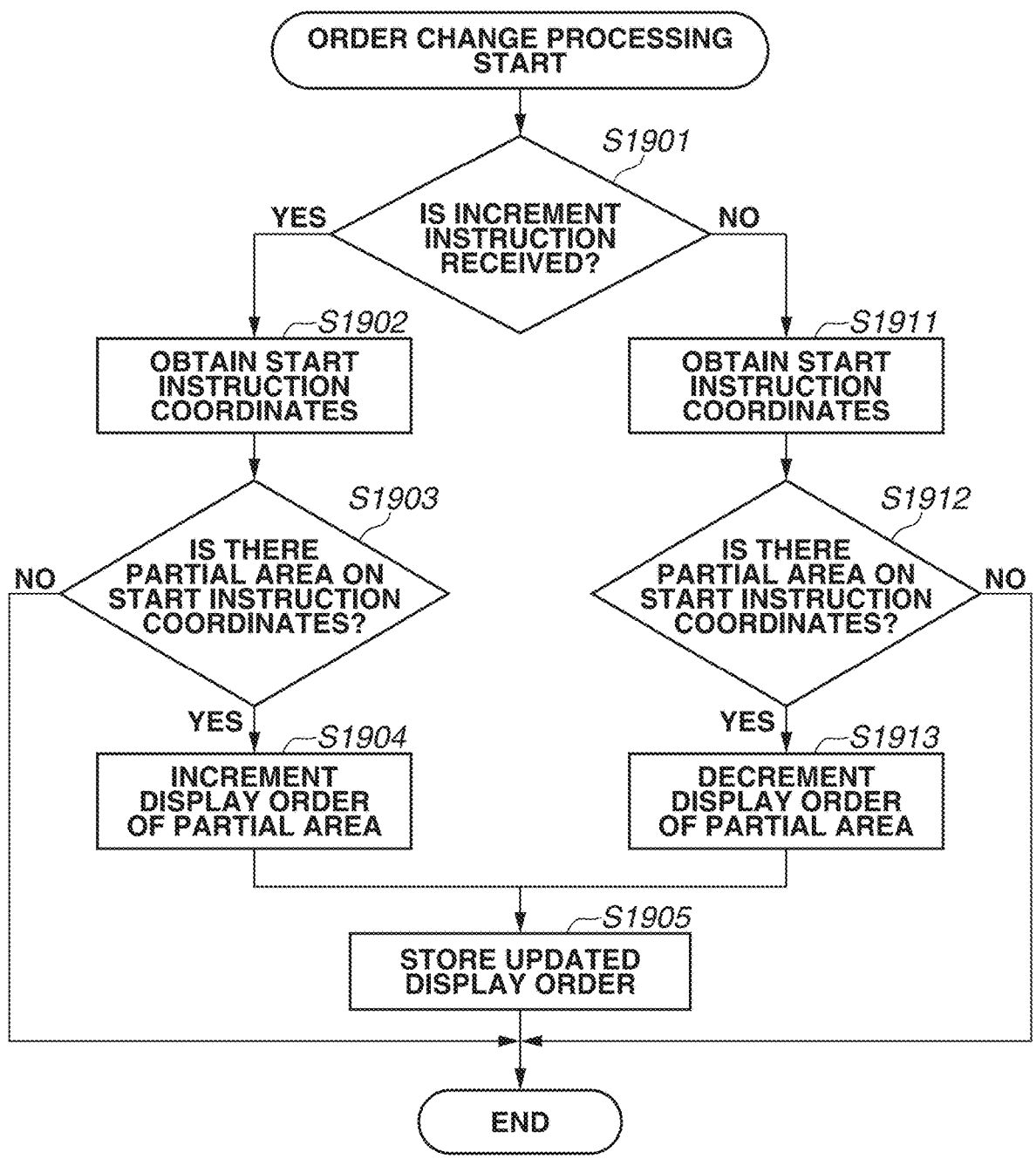
FIG. 19 is a flowchart of order change processing according to a third exemplary embodiment.

In the present exemplary embodiment, the order change processing described in the first exemplary embodiment with reference to FIG. 13 is replaced with order change processing described with reference to FIG. 19. Screen transitions of the display unit 105 of the image display apparatus 100 in a case where the order change processing illustrated in FIG. 19 is performed will be described with reference to FIGS. 21A, 21B, 21C, 21D, 21E, and 21F.

(Order Change Processing)

The order change processing of partial areas will be described with reference to the flowchart of FIG. 19.

The order change processing is processing for changing the display order of the partial areas.

In step S1901, the edit processing unit 115 receives a user operation on the display unit 105. If an "increment instruction" is received (YES in step S1901), the processing proceeds to step S1902. If a "decrement instruction" is received (NO in step S1902), the processing proceeds to step S1911.

Figure 21A:
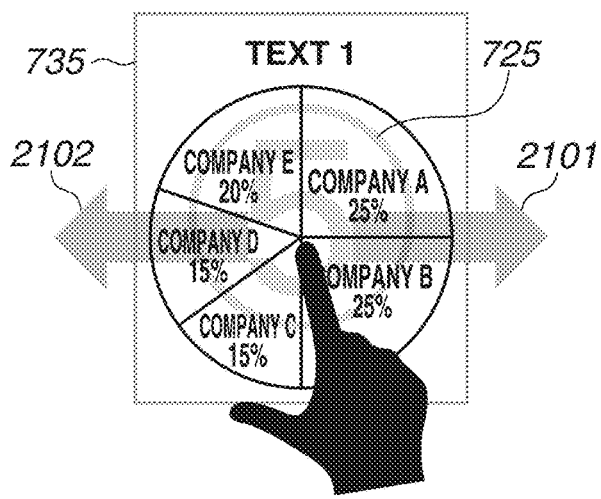
FIGS. 21A, 21B, 21C, 21D, 21E and 21F are diagrams illustrating an example of screen transitions during the order change processing according to the third exemplary embodiment.

For example, if a rightward swipe operation is detected, the edit processing unit 115 determines that an "increment instruction" is received. As illustrated in FIG. 21A, an example of the rightward swipe operation is an operation 2101 to swipe to the right from near the order label 725 included in the partial area 735.

An "increment instruction" refers to an instruction to increase the numerical value indicating the display order of the target partial area by one (delay the display order by one).

For example, if a leftward swipe operation is detected, the edit processing unit 115 determines that a "decrement instruction" is received. As illustrated in FIG. 21A, an example of the leftward swipe operation is an operation 2102 to the left from near the order label 725 included in the partial area 735.

A "decrement instruction" is an instruction to decrease the numerical value indicating the display order of the target partial area by one (advance the display order by one).

In step S1902, the edit processing unit 115 obtains coordinates where the "increment instruction" is started. The coordinates will be referred to as start instruction coordinates.

In step S1903, the edit processing unit 115 performs a hit determination whether there is a partial area on the start instruction coordinates. The hit determination is performed with respect to all the partial areas included in the page image except the one having an area attribute of the background. The background is excluded from the hit determination since the background refers to the entire page image and is excluded from a change of order.

If there is a partial area at the start instruction coordinates (YES in step S1903), the processing proceeds to step S1904. If not (NO in step S1903), the processing ends.

In step S1904, the edit processing unit 115 increments the display order of the partial area having located on the start instruction coordinates.

In step S1905, the edit processing unit 115 stores the updated display order into the partial area management table in an overwriting manner. The order change processing ends.

In step S1911, the edit processing unit 115 obtains coordinates where the "decrement instruction" is started. The coordinates will be referred to as start instruction coordinates.

In step S1912, the edit processing unit 115 performs a hit determination whether there is a partial area on the start instruction coordinates. The hit determination is performed with respect to all the partial areas included in the page image except the one having an area attribute of the background. The background is excluded from the hit determination since the background refers to the entire page image and is excluded from a change of order.

If there is a partial area on the start instruction coordinates (YES in step S1912), the processing proceeds to step S1913. If not (NO in step S1912), the processing ends.

In step S1913, the edit processing unit 115 decrements the display order of the partial area having located on the start instruction coordinates.

In step S1905, the edit processing unit 115 stores the updated display order into the partial area management table in an overwriting manner. The order change processing ends.

(Screen Transitions During Order Change Processing)

Screen transitions in a case where the order change processing described with reference to FIG. 19 is performed will be described with reference to FIGS. 21A, 21B, 21C, 21D, 21E, and 21F. The updated partial area management table will be described with reference to FIGS. 20A and 20B.

A case of incrementing the display order of the partial area 415 which is the fifth in the display order in FIG. 7C and a case of decrementing the display order thereof will be described as examples. FIG. 5A illustrates the partial area data.

Figure 21B:
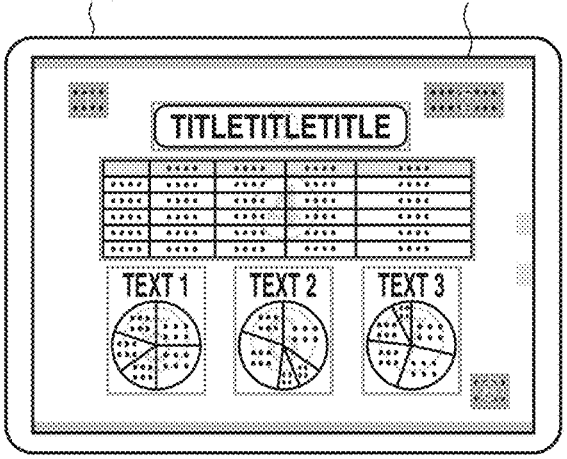

As described with reference to FIGS. 6, 7A, 7B, 7C, and 7D, in a case where the contents 200 are opened in the edit mode, the partial areas of the page image 210 are displayed with the order labels and frames of the corresponding partial areas superimposed as illustrated in FIG. 21B.

The case of incrementing the display order will initially be described.

Figure 21C:
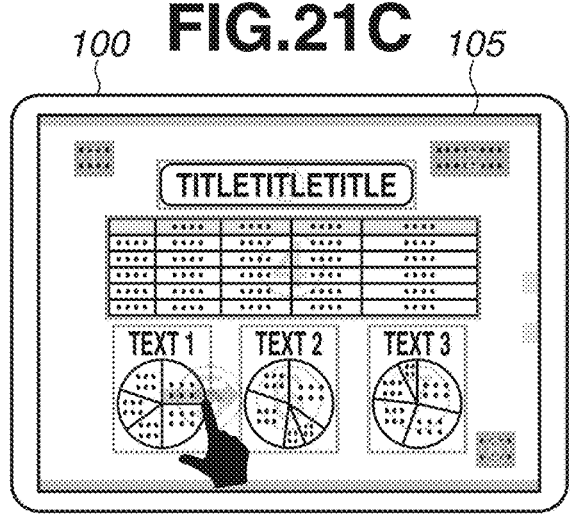

In the state illustrated in FIG. 21B, assume that a rightward swipe operation on the partial area 415 (pie chart of text 1) is received. FIG. 21C illustrates the state of display. In such a case, the processing proceeds from step S1901 to step S1902 when a start of the swipe operation is detected. In step S1902, the edit processing unit 115 obtains the start instruction coordinates which represent the start position of the swipe operation.

In step S1903, the edit processing unit 115 performs a hit determination between the start instruction coordinates and the partial areas 411 to 418 (page number=1, partial area number=1 to page number=1, partial area number=8 in FIG. 5A) in the page image 201, excluding the partial area 410 having an area attribute of the background. Since the start instruction coordinates fall within the partial area 415 (page number=1, partial area number=5, display order=5 in FIG. 5A), the processing proceeds to step S1904. In step S1904, the edit processing unit 115 increments the display order of the partial area 415 by one.

The increment changes the partial area 415 (page number=1, partial area number=5 in FIG. 5A) from the fifth to the sixth in the display order. The edit processing unit 115 changes the partial area 416 (page number=1, partial area number=6 in FIG. 5A), which has been the sixth in the display order, from the sixth to the fifth in the display order accordingly.

Figure 21D:
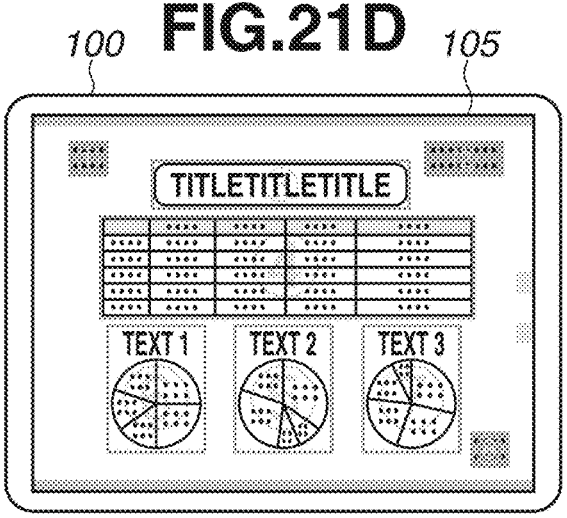

FIG. 20A illustrates the partial area management table in such a state. FIG. 21D illustrates the state of display.

Next, the case of decrementing the display order will be described.

Figure 21E:
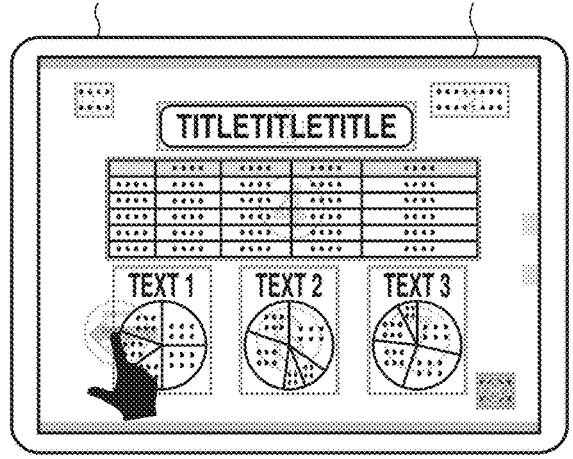

In the state illustrated in FIG. 21B, assume that a leftward swipe operation on the partial area 415 (pie chart of text 1) is received. FIG. 21E illustrates the state of display. In such a case, the processing proceeds from step S1901 to step S1911 when a start of the swipe operation is detected. In step S1911, the edit processing unit 115 obtains the start instruction coordinates which represent the start position of the swipe operation.

In step S1912, the edit processing unit 115 performs a hit determination between the start instruction coordinates and the partial areas 411 to 418 (page number=1, partial area number=1 to page number=1, partial area number=8 in FIG. 5A) in the page image 201, excluding the partial area 410 having an area attribute of the background. Since the start instruction coordinates fall with the partial area 415 (page number=1, partial area number=5, display order=5 in FIG. 5A), the processing proceeds to step S1913. In step S1913, the edit processing unit 115 decrements the display order of the partial area 415 by one.

The decrement changes the partial area 415 (page number=1, partial area number=5 in FIG. 5A) from the fifth to the fourth in the display order. The edit processing unit 115 changes the partial area 414 (page number=1, partial area number=4 in FIG. 5A), which has been the fourth in the display order, from the fourth to the fifth in the display order accordingly.

Figure 21F:
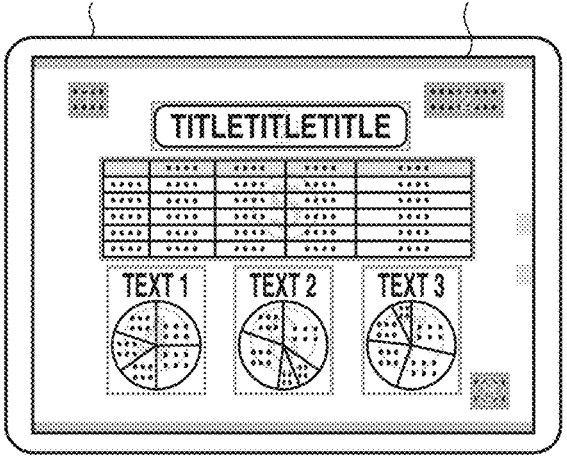

FIG. 20B illustrates the partial area management table in such a state. FIG. 21F illustrates the state of display.

As described above, according to the present exemplary embodiment, the display order can be easily incremented and decremented with a swipe operation on a partial area.

With this configuration, the display order of partial areas in a page image can thus be changed with simple, intuitive operations.

As in the foregoing exemplary embodiments, providing of the presentation mode and the edit mode in opening contents can prevent the user from erroneously making operations of the edit mode in the presentation mode, so that the user's operation mistakes can be suppressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-011711, filed Jan. 25, 2016, which is hereby incorporated by reference herein in its entirety.

What is claimed is:

1. An image display apparatus comprising:
a display; and
at least one processor configured to perform processing including:
analyzing a page image to recognize partial areas corresponding to objects included in the page image;
acquiring information that indicates attribute of each of the partial areas;
automatically setting a display order of the partial areas based on positions of the recognized partial areas in the page image and a character writing direction of partial areas having character attribute;
changing the set display order in accordance with a user operation;
determining enlargement factors of the partial areas; and
causing the display to display the partial areas of the page image according to the determined enlargement factors in the changed display order.

2. The image display apparatus according to claim 1, wherein, when changing the set display order, the processor causes the display to further display, order labels that indicate the set display order currently set to the partial areas.

3. The image display apparatus according to claim 2,
a touch panel configured to detect a touch operation performed by the user;
wherein, in a case where a touch that started at a position corresponding to the further displayed order label of a first partial area ends at a position corresponding to a second partial area, the display order of the first partial area is changed based on the displayed order of the second partial area.

4. The image display apparatus according to claim 1, wherein, based upon that a second partial area among the plurality of partial areas is selected by the user after selection of a first partial area among the partial areas by the user, the processor replaces the display order of the second partial area with the display order of the first partial area.

5. The image display apparatus according to claim 1, further comprising:
a touch panel configured to detect a touch operation performed by the user;
wherein, in a case where a touch that started at a position corresponding to a first partial area ends at a position corresponding to a second partial area, the display order of the first partial area is changed based on the displayed order of the second partial area.

6. The image display apparatus according to claim 1,
a touch panel configured to detect a touch operation performed by the user;
wherein, in a case where a touch that started at a position corresponding to a first partial area ends at a position corresponding to a second partial area, the display order of the first partial area is changed to an order immediately before or immediately after the display order of the second partial area based on a position in the second partial area where the touch ends.

7. The image display apparatus according to claim 1,
wherein, in a case where a presentation mode for presenting the partial areas is selected, the processor causes the display to display the partial areas in the changed display order, and
wherein, in a case where an edit mode for changing the display order is selected, the processor causes the display to display the page image that allows the display order to be changed in accordance with the user operation.

8. The image display apparatus according to claim 1, further comprising:
a memory configured to store the display order set automatically based on the positions of the recognized partial areas;
wherein, based upon that the display order has been changed in accordance with the user operation, the display order stored in the memory is updated.

9. The image display apparatus according to claim 1,
wherein, based on the positions of the recognized partial areas and the information that indicates the attribute, the processor sets for each of the plurality of partial areas whether or not to display the partial area with enlargement.

10. The image display apparatus according to claim 1,
wherein the processor causes the display to perform display while graying out areas other than a partial area selected according to the display order.

11. The image display apparatus according to claim 1,
wherein, according to the display order, the processor selects one partial area from among the partial areas, and causes the display to display an image in which the selected one partial area is enlarged, and
wherein, based upon that an operation for display of a next partial area is performed by the user, the processor selects another partial area that is the next partial area according to the display order, and causes the display to display an image in which the selected another partial area is enlarged.

12. An image display method comprising:
analyzing a page image to recognize partial areas corresponding to objects included in the page image;
acquiring information that indicates attribute of each of the partial areas;
automatically setting a display order of the partial areas based on positions of the recognized partial areas in the page image and a character writing direction of partial areas having character attribute;
changing the set display order in accordance with a user operation;
determining enlargement factors of the partial areas; and
causing a display to display the partial areas of the page image according to the determined enlargement factors in the changed display order.

13. A non-transitory computer-readable storage medium storing a computer program for causing a computer to perform:
analyzing a page image to recognize partial areas corresponding to objects included in the page image;
acquiring information that indicates attribute of each of the partial areas;
automatically setting a display order of the partial areas based on positions of the recognized partial areas in the page image and a character writing direction of partial areas having character attribute;
changing the set display order in accordance with a user operation;
determining enlargement factors of the partial areas; and
causing a display to display the partial areas of the page image according to the determined enlargement factors in the changed display order.

* * * * *